US010340972B2

(12) United States Patent
Calhoun et al.

(10) Patent No.: US 10,340,972 B2
(45) Date of Patent: Jul. 2, 2019

(54) ULTRA LOW POWER SENSING PLATFORM WITH MULTIMODAL RADIOS

(71) Applicants: UNIVERSITY OF VIRGINIA PATENT FOUNDATION, Charlottesville, VA (US); THE REGENTS OF THE UNIVERSITY OF MICHIGAN, Ann Arbor, MI (US)

(72) Inventors: Benton H. Calhoun, Charlottesville, VA (US); Yousef Shakhsheer, Charlottesville, VA (US); Yanqing Zhang, Charlottesville, VA (US); Alicia Klinefelter, Charlottesville, VA (US); David D. Wentzloff, Ann Arbor, MI (US); Nathan E. Roberts, Ann Arbor, MI (US); Seunghyun Oh, Jangdaedong Daejeon (KR)

(73) Assignees: University of Virginia Patent Foundation, Charlottesville, VA (US); The Regents of the University of Michigan, Ann Arbor, MI (US)

( * ) Notice: Subject to any disclaimer, the term of this patent is extended or adjusted under 35 U.S.C. 154(b) by 4 days.

(21) Appl. No.: 15/670,386

(22) Filed: Aug. 7, 2017

(65) Prior Publication Data

US 2018/0097538 A1 Apr. 5, 2018

Related U.S. Application Data

(62) Division of application No. 14/015,425, filed on Aug. 30, 2013, now Pat. No. 9,729,189.
(Continued)

(51) Int. Cl.
*H04B 1/00* (2006.01)
*H04B 1/403* (2015.01)
(Continued)

(52) U.S. Cl.
CPC ............ *H04B 1/406* (2013.01); *H04B 1/1607* (2013.01); *H04W 4/70* (2018.02); *Y02D 70/00* (2018.01); *Y02D 70/40* (2018.01)

(58) Field of Classification Search
CPC ........ H04B 1/406; H04B 1/1607; H04W 4/70
(Continued)

(56) References Cited

U.S. PATENT DOCUMENTS

| 6,853,835 B2 | 2/2005 | Wynbeek |
| 6,987,755 B2 | 1/2006 | Monroe et al. |

(Continued)

FOREIGN PATENT DOCUMENTS

| EP | 1864473 | 3/2006 |
| JP | 2004-024551 A | 1/2004 |

(Continued)

OTHER PUBLICATIONS

Office Action dated Oct. 30, 2017, issued in counterpart Chinese Application No. 201380056576.3, with English translation (10 pages).

(Continued)

*Primary Examiner* — Ping Y Hsieh
(74) *Attorney, Agent, or Firm* — Weaver Austin Villeneuve & Sampson LLP

(57) ABSTRACT

An apparatus comprises a system on a chip (SoC). In some embodiments, the SoC includes a power supply circuit, a power management circuit operatively coupled to the power supply circuit, a first wireless communications circuit and a second wireless communications circuit. The first wireless communications circuit is configured to receive an RF signal and is operatively coupled to the power supply circuit and the power management circuit. The first wireless communications circuit has a net radio frequency (RF) power gain no more than unity before at least one of downconversion of (Continued)

the RF signal or detection of the RF signal. The second wireless communications circuit is operatively coupled to the power supply circuit and the power management circuit.

23 Claims, 14 Drawing Sheets

Related U.S. Application Data

(60) Provisional application No. 61/780,008, filed on Mar. 13, 2013, provisional application No. 61/694,855, filed on Aug. 30, 2012.

(51) Int. Cl.
*H04B 1/16* (2006.01)
*H04W 4/70* (2018.01)

(58) Field of Classification Search
USPC .......................................... 455/552.1, 553.1
See application file for complete search history.

(56) References Cited

U.S. PATENT DOCUMENTS

| | | | |
|---|---|---|---|
| 7,091,854 B1 | 8/2006 | Miao | |
| 7,266,729 B2 | 9/2007 | Bahr et al. | |
| 7,304,976 B2 | 12/2007 | Mao et al. | |
| 7,356,618 B2 | 4/2008 | Lienhart et al. | |
| 7,378,953 B2 | 5/2008 | Coronel et al. | |
| 7,379,718 B2 | 5/2008 | Dor | |
| 7,392,061 B2 | 6/2008 | Hurwitz et al. | |
| 7,454,634 B1 | 11/2008 | Donovan et al. | |
| 7,599,942 B1 | 10/2009 | Mohamad | |
| 7,835,226 B2 | 11/2010 | Kokosalakis et al. | |
| 7,921,206 B2 | 4/2011 | Nagaraja et al. | |
| 7,969,300 B2 | 6/2011 | Coronel et al. | |
| 7,969,928 B2 | 6/2011 | Chiricescu et al. | |
| 7,970,574 B2 | 6/2011 | Jin | |
| 7,978,666 B2 | 7/2011 | Keshavarzian et al. | |
| 7,999,685 B2 | 8/2011 | Sanchez et al. | |
| 8,000,468 B2 | 8/2011 | Huang | |
| 8,022,822 B2 | 9/2011 | Liang et al. | |
| 8,027,474 B2 | 9/2011 | Huang et al. | |
| 8,064,363 B2 | 11/2011 | Kohvakka et al. | |
| 8,089,910 B2 | 1/2012 | Doh et al. | |
| 8,095,177 B2 | 1/2012 | Ida | |
| 8,130,673 B2 | 3/2012 | Ewing et al. | |
| 8,170,480 B1 | 5/2012 | Kammer et al. | |
| 8,176,093 B2 | 5/2012 | Mohamad | |
| 8,176,520 B1 | 5/2012 | Mitchell | |
| 8,189,479 B1 | 5/2012 | Doherty et al. | |
| 8,229,699 B2 | 7/2012 | Jin | |
| 9,729,189 B2 | 8/2017 | Calhoun et al. | |
| 2003/0083037 A1* | 5/2003 | Yajima | G06F 1/26 455/343.1 |
| 2004/0172603 A1 | 9/2004 | Collmeyer et al. | |
| 2006/0074550 A1 | 4/2006 | Freer et al. | |
| 2006/0128350 A1 | 6/2006 | Hurwitz et al. | |
| 2007/0060093 A1* | 3/2007 | Kerth | H04W 52/028 455/296 |
| 2007/0079161 A1 | 4/2007 | Gupta | |
| 2008/0283901 A1 | 11/2008 | Walker et al. | |
| 2008/0293447 A1 | 11/2008 | Rofougaran et al. | |
| 2008/0299974 A1 | 12/2008 | Lee et al. | |
| 2009/0023391 A1 | 1/2009 | Falck | |
| 2009/0080349 A1 | 3/2009 | Rofougaran et al. | |
| 2009/0167535 A1 | 7/2009 | Sanchez et al. | |
| 2009/0205011 A1 | 8/2009 | Jain et al. | |
| 2009/0268911 A1 | 10/2009 | Singh | |
| 2009/0268914 A1 | 10/2009 | Singh | |
| 2009/0271622 A1 | 10/2009 | Singh | |
| 2010/0036211 A1 | 2/2010 | La Rue et al. | |
| 2010/0099367 A1 | 4/2010 | Shamim et al. | |
| 2010/0121157 A1 | 5/2010 | Espina et al. | |
| 2010/0131445 A1 | 5/2010 | Wu et al. | |
| 2010/0142396 A1 | 6/2010 | Kim et al. | |
| 2010/0277286 A1 | 11/2010 | Burkart et al. | |
| 2010/0285807 A1 | 11/2010 | Miller-Smith | |
| 2010/0293288 A1 | 11/2010 | Meerbergen et al. | |
| 2010/0312071 A1 | 12/2010 | Schenk | |
| 2011/0002324 A1 | 1/2011 | Falck et al. | |
| 2011/0055643 A1 | 3/2011 | Kim et al. | |
| 2011/0069707 A1 | 3/2011 | Roh et al. | |
| 2011/0101788 A1 | 5/2011 | Sun et al. | |
| 2011/0137133 A1 | 6/2011 | Perez | |
| 2011/0145894 A1 | 6/2011 | Morchon et al. | |
| 2012/0019386 A1 | 1/2012 | Doriaswami et al. | |
| 2012/0030486 A1 | 2/2012 | Pop et al. | |
| 2012/0054511 A1 | 3/2012 | Brinks et al. | |
| 2012/0129573 A1* | 5/2012 | Rofougaran | H04W 52/0261 455/553.1 |
| 2012/0169491 A1 | 7/2012 | Chang et al. | |
| 2012/0172075 A1 | 7/2012 | Hyon et al. | |
| 2012/0187897 A1 | 7/2012 | Lenk et al. | |
| 2013/0012135 A1* | 1/2013 | Ruohonen | H04B 1/406 455/63.1 |
| 2013/0106498 A1 | 5/2013 | Sonkar et al. | |
| 2015/0303975 A1 | 10/2015 | Calhoun et al. | |

FOREIGN PATENT DOCUMENTS

| | | |
|---|---|---|
| JP | 2006-288619 A | 10/2006 |
| JP | 2008-524844 A | 7/2008 |
| JP | 2009-268676 A | 11/2009 |
| JP | 2010-233697 A | 10/2010 |
| JP | 2011-509719 A | 3/2011 |
| JP | 2012-147838 | 8/2012 |
| WO | WO2006/066186 | 6/2006 |
| WO | WO2006/131849 | 12/2006 |
| WO | WO2007/149848 | 12/2007 |
| WO | WO2009/008681 | 1/2009 |
| WO | WO2009/081348 | 7/2009 |
| WO | WO2009/090575 | 7/2009 |
| WO | WO2009/095834 | 8/2009 |
| WO | WO2009/153710 | 12/2009 |
| WO | WO2010/020945 | 2/2010 |
| WO | WO2011/107856 | 9/2011 |

OTHER PUBLICATIONS

Office Action dated Jan. 9, 2018, issued in counterpart Japanese Application No. 2015-530106, with English translation (6 pages).
Extended Supplementary European Search Report dated Oct. 4, 2016, issued in counterpart Application No. 13833622.7.0 (10 pages). Cited in parent U.S. Appl. No. 14/015,425.
G. Chen, et al., "Millimeter-Scale Nearly Perpetual Sensor System with Stacked Battery and Solar Cells," in Proceedings of the IEEE International Solid-State Circuits Conference (2010), pp. 288-289. Cited in parent U.S. Appl. No. 14/015,425. Cited in parent U.S. Appl. No. 14/015,425.
G. Chen, et al., "Circuit Design Advances for Wireless Sensing Applications," Proceedings of the IEEE, Nov. 2010, vol. 98, No. 11, pp. 1808-1827. Cited in parent U.S. Appl. No. 14/015,425.
Partial Supplementary European Search Report dated Jun. 29, 2016, issued in counterpart Application No. 13833622.7.0. Cited in parent U.S. Appl. No. 14/015,425.
International Search Report and Written Opinion for International Application No. PCT/US2013/57597, dated Jan. 16, 2014. Cited in parent U.S. Appl. No. 14/015,425.
F. Zhang, et al., "A Battery-less 19 µW MICS/ISM-Band Energy Harvesting Body Area Sensor Node SoC," International Solid-State Circuits Conference, Feb. 19, 2012. Cited in parent U.S. Appl. No. 14/015,425.
N.E. Roberts, et al., "A 98nW Wake-up Radio for Wireless Body Area Networks," IEEE Radio Frequency Integrated Circuits Symposium (RFIC), Jun. 2012, pp. 373-376. Cited in parent U.S. Appl. No. 14/015,425.
Y. Shakhasheer, et al., "A Custom Processor for Node and Power Management of a Battery-less Body Sensor Node in 130nm CMOS," Custom Integrated Circuits Conference, Sep. 2012. Cited in parent U.S. Appl. No. 14/015,425.

(56) References Cited

OTHER PUBLICATIONS

Hwang, et al., "Revisiting Random Key Pre-Distribution Schemes for Wireless Sensor Networks," Proc. of the Second ACM Workshop on Security of Ad Hoc and Sensor Networks, 2004 p. 43-52. Cited in parent U.S. Appl. No. 14/015,425.

U.S. Appl. No. 61/658,515, filed Jun. 12, 2012, "Ultra-Low-Power Radio for Short-Range Communication," to David Wentzloff and Nathan Roberts. Cited in parent U.S. Appl. No. 14/015,425.

U.S. Appl. No. 61/600,467, filed Feb. 17, 2012, "Battery-less Energy Harvesting Sensor Node SoC and Related Method Thereof," Benton Calhoun and Brian Otis. Cited in parent U.S. Appl. No. 14/015,425.

Japanese Office Action dated Nov. 6, 2018 issued in Application No. JP 2018-020842 (no translation).

Chinese Second Office Action dated Jul. 4, 2018 issued in Application No. CN 201380056576.3.

PCT International Preliminary Report on Patentability and Written Opinion dated Jun. 2, 2015, issued in Application No. PCT/US2013/057597.

U.S. Office Action dated Jun. 27, 2014 issued in U.S. Appl. No. 14/015,425.

U.S. Final Office Action dated Dec. 3, 2014 issued in U.S. Appl. No. 14/015,425.

U.S. Office Action dated Apr. 2, 2015 issued in U.S. Appl. No. 14/015,425.

U.S. Notice of Allowance dated Mar. 30, 2017 issued in U.S. Appl. No. 14/015,425.

European Office Action dated Oct. 25, 2018 issued in Application No. 13833622.7.

\* cited by examiner

ULTRA LOW POWER SENSING PLATFORM WITH MULTIMODAL RADIOS

CROSS-REFERENCE TO RELATED PATENT APPLICATIONS

This patent application is a divisional of U.S. patent application Ser. No. 14/015,425 entitled "Ultra Low Power Wireless Sensing Platform with Multimodal Radios" filed on Aug. 30, 2013, which claims priority to U.S. Pat. App. 61/694,855 entitled "Ultra Lower Power Wireless Sensing Platform with Multimodal Radios and Wakeup Radio" filed on Aug. 30, 2012 and to U.S. Pat. App. 61/780,008 entitled "Ultra Low Power Wireless Sensing Platform with Multimodal Radios" filed on Mar. 13, 2013, all of which prior applications are incorporated herein by reference in their entireties.

STATEMENT REGARDING FEDERALLY SPONSORED RESEARCH OR DEVELOPMENT

This invention was made with government support under CNS1035303 awarded by the National Science Foundation. The government has certain rights in the invention.

BACKGROUND

Embedded systems can be used in a variety of applications, including providing monitoring, sensing, control, or security functions. Such embedded systems are generally tailored to specific applications, according to relatively severe constraints on size, power consumption, or environmental survivability.

In particular, one class of embedded system can include sensor nodes, such as for sensing or monitoring one or more physiologic parameters, or for other applications. A sensor node having wireless communication capability can be referred to as a Wireless Sensor Node (WSN). Similarly, a sensor node located on, nearby, or within a body of a subject can be referred to as a Body Area Sensor node (BASN) or Body Sensor node (BSN). Sensor nodes can provide significant benefit to care providers, such as enabling continuous monitoring, actuation, and logging of physiologic information, facilitating automated or remote follow-up, or providing one or more alerts in the presence of deteriorating physiologic status. The physiologic information obtained using the sensor node can be transferred to other systems, such as used to help diagnose, prevent, and respond to various illnesses such as diabetes, asthma, cardiac conditions, or other illnesses or conditions.

OVERVIEW

In a physiologic sensing example, a sensor node can provide particular value to a subject or care giver if the sensor node includes certain features such as long-term monitoring capability or wearability, for example. A long lifetime for a sensor node without maintenance, replacement, or manual recharging becomes ever more important as health care costs escalate or as more care providers attempt to transition to remote patient follow-up and telemedicine.

It is believed that generally-available sensor nodes are precluded from widespread adoption because of a lack of extended operational capability or wearability. For example, sensor nodes including a large primary or rechargeable battery can be uncomfortable to wear, and a sensor node having a smaller battery is still undesirable because patients or other users may not comply with the required recharging or replacement interval. Similarly, sensor nodes requiring conductive data transfer interfaces are generally cumbersome, because the wearer or care giver typically must manually connect a communication interface cable to the node to transfer information to or from the node. Wireless communication circuitry may reduce or eliminate the need for such cumbersome wired interfaces. But, such wireless circuitry can consume substantial amounts of energy further taxing a limited energy budget or limiting operating life of generally-available sensor nodes.

In an example, a sensor node, such as a physiologic sensor node, can include one or more semiconductor devices having a high degree of integration of various system functions. Such a semiconductor device can be referred to as a "System-on-a-Chip" or SoC. An SoC can provide digital or mixed signal circuitry realizing all major functions of the system, such as including one or more of general-purpose processor circuits, special purpose processor circuits, analog signal conditioning circuits, supply regulation or converter circuits, voltage or current reference circuits, or power management circuits.

The sensor node can also include communication circuitry, such as wirelessly coupling the sensor node to one or more other devices such as to send or receive information. An array of one or more sensor nodes can be coupleable to each other or to one or more other devices or assemblies. Such an arrangement can be referred to as a Body Area Network (BAN).

The present inventors have recognized, among other things, that ultra-low power (ULP) techniques can be applied to one or more circuits included in a sensor node. ULP techniques can be used such as to provide an SoC included as a portion of a sensor node. For example, such an SoC for a sensor node can include one or more analog or digital portions configured for subthreshold operation.

Other techniques can be used instead of subthreshold operation, or in addition to subthreshold operation, such as power or clock gating to disable or suspend operation of specified sections of the system, or including adjusting a duty cycle, a clock frequency (e.g., clock throttling), or a supply parameter (e.g., supply voltage throttling) so as to reduce power consumption.

In an example, the sensor node need not include a battery. Instead of a battery, or in addition to a battery, the sensor node can include one or more other power sources. For example, the sensor node can include an energy-harvesting capability, such as using a thermoelectric generator (TEG). Such energy harvesting can include storing energy within a portion of an integrated circuit or "off-chip," such as using a capacitor. A power supply circuit can be included as a portion of the sensor node, such as to provide conversion of energy provided by a power source to one or more specified voltages.

In an example, a sensor node can include a source of operating energy, a power management processor circuit coupled to the source of operating energy and configured to select an energy consumption level of the sensor node based on a state of the source of operating energy, a digital processor circuit including an operational mode established by the power management processor circuit based on the selected energy consumption level, a memory circuit coupled to the digital processor circuit, and a first wireless receiver circuit coupled to the memory circuit. In an operational mode established by the power management circuit, the first wireless receiver circuit can be configured to receive information wirelessly without requiring use of the digital processor circuit and transfer at least a portion of the received information to the memory circuit without requiring use of the digital processor circuit.

One or more of a protocol, data rate, operating frequency range, or modulation technique used by one or more communication circuits of a sensor node can be adjusted or selected, such as based on a selected energy consumption level established by the power management circuit. For example, the first wireless receiver circuit can be configured to consume about 100 nanowatts (nW) or less, such as to provide capability of receiving information in most or all operational modes of the sensor node (e.g., an "always-on" receiver).

In contrast to duty-cycled approaches, operation of the first wireless receiver circuit continuously, or nearly continuously, can provide extremely low latency for sensor node response to commands or other information received by the first wireless receiver circuit, despite a total sensor node energy consumption of less than about, for example, 1 microwatt (μW) in a standby mode. In an illustrative example, a latency can be less than 10 milliseconds (ms) between receiving a specified packet of information and a reaction by the sensor node to the packet, such as using a receiver circuit consuming less than about 100 nW, and a total sensor node consumption less than about 1 μW, such as without requiring a time consuming or energy depleting synchronization.

This overview is intended to provide an overview of subject matter of the present patent application. It is not intended to provide an exclusive or exhaustive explanation of the invention. The detailed description is included to provide further information about the present patent application.

Figure 1A:
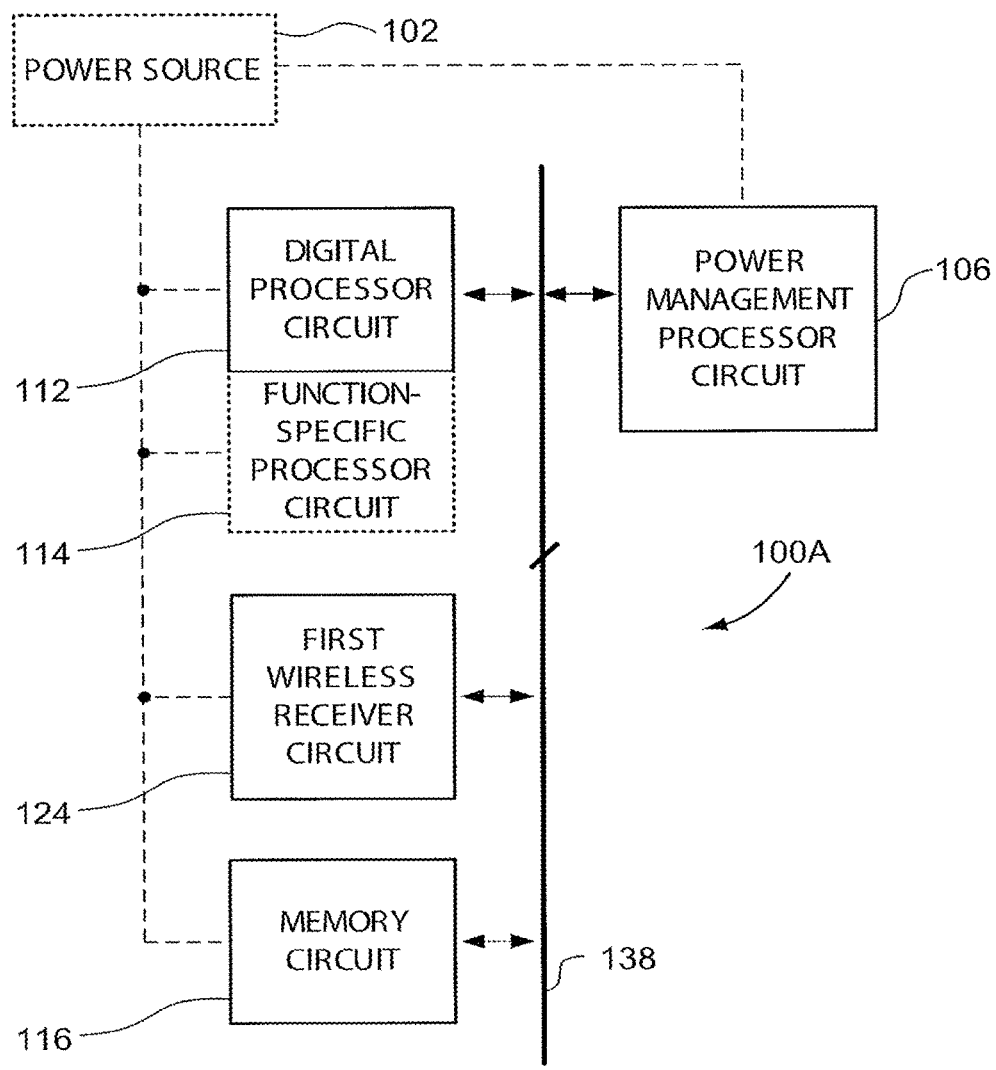
FIG. 1A illustrates generally an example of a sensor node or a portion of a sensor node such as can be included in an integrated circuit.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIG. 1A illustrates generally a block diagram of an example 100A of a sensor node or a portion of a sensor node such as can be included in an integrated circuit. The sensor node can include or can be coupled to a power source 102. The power source 102 can include one or more of a rechargeable battery, a primary cell battery, or an energy-harvesting circuit.

For example, energy harvesting techniques can include obtaining energy from an ambient optical source, from electromagnetic coupling, from a thermal gradient, or from a mechanical vibration. Energy harvesting techniques can provide an extended operable lifetime as compared to sensor nodes reliant upon a battery. To provide sustained operation, however, an energy-harvesting sensor node generally consumes less energy than the amount harvested over the relevant period of time. The sensor node can be battery-less or can operate without requiring a primary or rechargeable battery, such as powered continuously or for an extended period of operating using one or more of wirelessly-coupled energy or energy provided using energy harvesting techniques.

The sensor node can include one or more of a digital processor circuit 112, such as a microcontroller or microprocessor circuit, or a function specific processor circuit 114 (e.g., an "accelerator circuit"). The sensor node can include one or more wireless communication circuits, such as a first wireless receiver circuit 124. The digital processor circuit 112 and the first wireless receiver circuit can be coupled to a memory circuit 116, such as using a bus 138.

Figure 1B:
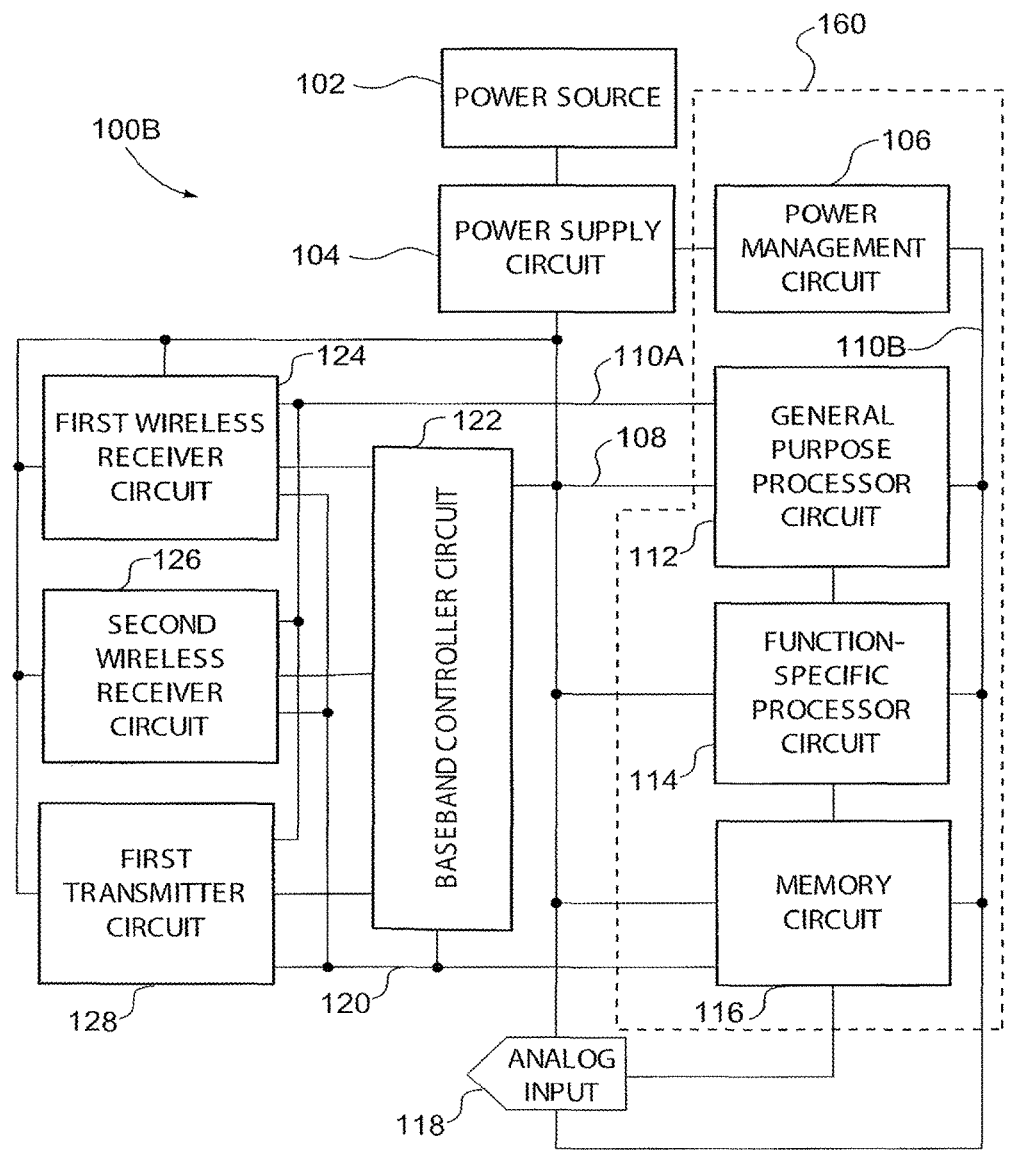
FIG. 1B illustrates generally an example of a sensor node or a portion of a sensor node such as can be included in an integrated circuit.

One or more digital portions of the examples shown in FIGS. 1A and 1B, or elsewhere, can operate in a subthreshold operational mode. A subthreshold operational mode can be established such as providing, adjusting, or selecting a supply voltage provided by a regulator circuit (not shown in FIGS. 1A and 1B) so as to establish subthreshold operation of a field effect transistor (FET) in one or more of the power management processor circuit 106, the digital processor circuit 112, the function-specific processor circuit 114, or in one or more other circuits of the system, such as in one or more digital or mixed signal circuits.

Subthreshold operation can be described as operating one or more FETs in a weak-inversion mode where a gate-to-source voltage is established at or below a threshold voltage ($V_t$) for the one or more FETs, resulting in a primarily exponential dependence on drain-to-source current as a function of gate-to-source voltage. Various techniques can be used to establish subthreshold operation, such as providing a supply voltage having a VDD-to-VSS voltage below the threshold voltage of all FETs in a section coupled to the supply voltage. However, subthreshold operation modes of the digital or analog portions of the sensor node need not be established by using supply voltages below the threshold voltage of all FETs in a particular section. For example, a respective subset of one or more FETs can be biased to establish subthreshold operation, while such blocks may be still be connected to respective supply voltages in excess of the threshold. Alternatively, or additionally, an operational mode of a section or block can be established such as selecting a power supply bus from amongst an available group of power supply busses configured to provide respective operating voltages, or by adjusting a power supply bus voltage using an adjustable power supply circuit.

A tradeoff can exist between energy efficiency, maximum clock speed, and supply voltage. Subthreshold operation need not be restricted to a single supply voltage. For example, one or more of a clock frequency or a supply voltage can be adjusted such as to provide a specified level of computational capability or other operational performance while maintaining low power consumption, as discussed in the examples below.

Other criteria can be used to specify or describe subthreshold operation, such as using a current density perspective. For example, subthreshold operation can be described as a region of FET operation where transconductance (e.g., $g_m$) is at a relative or absolute maximum, or where transconductance is primarily dependent on threshold voltage and drain current, and exhibits only a weak (or no) dependence on variation in gate-to-source voltage. Such subthreshold operation, along with or instead of other techniques, can provide the sensor node with extended longevity even though the available energy obtained using the wireless receiver circuit or energy harvesting transducer may be quite limited (e.g., on the order of microwatts).

The sensor node can include a power management processor circuit 106 that can be configured to adjust an energy consumption level of the sensor node, such as using information obtained by monitoring a state of the power source 102. For example, if the power source 102 includes a battery or capacitor, the monitored state of the power source can include one or more of a voltage or a charge state of the battery or capacitor. Other criteria can be used to provide information indicative of the state of the power source 102, such as an output voltage or current provided by an energy harvesting circuit.

The power management processor circuit 106 can establish operational modes of one or more other portions of the sensor node, such as selecting or controlling an operational mode of the digital processor circuit 112, the function specific processor circuit 114, the first wireless receiver circuit 124, or the memory circuit 116, such as using information about the state of the power source 102. For example, the digital processor circuit can be one or more of suspended or disabled in an energy consumption mode selected by the power management processor circuit 106, such as based on a selected energy consumption level of the sensor node. Such an energy consumption level can be selected from amongst a group of available energy consumption levels or schemes, such as based on or using information about an available amount of energy or a state of a power source 102. Such schemes can include a look-up table or other information indicative of respective modes for respective functional blocks of the sensor node corresponding to respective selected energy consumption levels. Such levels or schemes may be reconfigured, such as on-the-fly using information received using the first wireless receiver circuit 124.

In an example, with the sensor node in an energy consumption level corresponding to a standby, sleep, or low energy consumption state, the first wireless receiver circuit 124 can be configured to receive information wirelessly without requiring use of the digital processor circuit 112 or the function-specific processor circuit 114. For example, the sensor node can be configured to provide wireless receiving of information (e.g., radiatively coupled to the first wireless receiver circuit 124), and transfer of wirelessly-received information to a portion of the memory circuit 116 (e.g., using a direct memory access (DMA) scheme), while other portions of the sensor node or suspended or disabled. The memory circuit 116 can include a volatile memory circuit, such as a static random access memory (SRAM) or other memory technology, such as configured for a subthreshold operational mode.

FIG. 1B illustrates generally a block diagram of an example 100B of a sensor node or a portion of a sensor node such as an integrated circuit. The example 100B of FIG. 1B can include a power source 102 (e.g., one or more of a battery, a thermoelectric energy source, a mechanical energy source, or one or more other sources, as discussed above). The power source 102 can be located "off-chip" with respect to one or more other circuits included as a portion of the sensor node.

The power source 102 can be coupled to a power supply circuit 104. If the voltage provided by the power source 102 is below a desired power supply circuit 104 output voltage range, the power supply circuit 104 can include a "boost" configuration (e.g., a DC-to-DC converter), such as to provide one or more specified direct current (DC) voltages to other circuitry, such as using a power supply bus 108. The power supply 104 can be coupled to other circuitry, such as a power management circuit 106, a general purpose processor circuit 112 (e.g., a microcontroller unit (MCU) or microprocessor core), a function-specific processor circuit 114, a memory circuit 116, an analog input 118, a baseband controller circuit 122, a first wireless receiver circuit 124, a second wireless receiver circuit 126, or a first transmitter circuit 128.

The power management circuit 106 can be included as a portion of a digital section 160 of a System-on-Chip (SoC). Such a digital section 160 can include one or more other digital circuits, such as the general purpose processor circuit 112, the function-specific processor circuit 114 (or multiple accelerator circuits), or the memory circuit 116. One or more of the circuits included in the digital section 160, or other circuits, can be configured to provide a subthreshold operational mode or a superthreshold operational mode. In the subthreshold operational mode, such digital circuitry can consume significantly less power at the cost of higher leakage and slower switching time, as compared to a superthreshold operational mode.

In an example, the general purpose processor circuit 112 can be placed in a standby operational mode (e.g., in a low-power-consuming mode that can include an entirely powered-down state, or a clock-gated state). The power management circuit 106 can be configured perform control or supervisory functions while the general purpose processor circuit 112 is in the standby mode or otherwise disabled.

The power management circuit 106 or the general purpose processor circuit 112 can be coupled to a first communication bus 110A or a second communication bus 110B. The busses 110A through 110B need not be physically separate. The power management circuit 106 or the general purpose processor circuit 112 can control other circuits either using the respective buses 110A through 110B, or through memory-mapped configuration registers, such as store using the memory circuit 116.

For example, one or more of the first wireless receiver circuit 124, the second wireless receiver circuit 126, or the first transmitter circuit 128 can be configured to access the memory circuit 116, such as using a coupling 120. The memory circuit 116 need not be a single circuit or array, and can include various buffers such as a first-in-first-out (FIFO) buffer.

The first wireless receiver circuit 124 can be configured to receive information indicative of a command for the sensor node (e.g., a command to activate or enable other portions of the sensor node), configuration information for other portions of the sensor node, or instructions to be performed by the general purpose processor circuit 112, for example. As discussed in the example of FIG. 1A, the first wireless receiver circuit can include an ultra-low-power (ULP) architecture, such as to provide continuous or nearly-continuous receiving capability in all operational modes that can be established by the power management circuit 106. In an illustrative example, a latency can be less than 10 milliseconds (ms) between receiving a specified packet of information and a reaction by the sensor node to the packet, such as using a first wireless receiver circuit 124 consuming less than about 100 nW, and a total sensor node consumption less than about 1 µW, such as without requiring a time consuming or energy depleting synchronization.

One or more of the first wireless receiver circuit 124, the second wireless receiver circuit 126, or the first transmitter circuit 128 can be configurable such as based on a selected energy consumption level established by the power management circuit 106, or other circuits. For example, one or more of which radio to use, a protocol, a data rate, a modulation scheme, or a frequency range for communication can be selected based on the selected energy consumption level. In this manner, respective communication circuits can be used or enabled to establish a specified energy consumed per communicated bit based on an available amount of energy. As discussed above, such an energy consumption level can be specified at least in part using information about a state of a power source 102.

In an example, the second wireless receiver circuit 126 can receive information at a higher data transfer rate than the first wireless receiver circuit 124. The second wireless receiver circuit 126 can be one or more of duty-cycled or disabled when a specified energy consumption level is selected, such as when a state of the power source 102 indicates a relative dearth of available energy. The first wireless receiver circuit 124 can remain enabled in such a selected energy consumption level. If the state of the power source 102 indicates an abundant supply of available energy, the second wireless receiver circuit 126 can be re-enabled or duty cycling of the second wireless receiver circuit 126 can be inhibited.

In an example, the first wireless receiver circuit 124 can receive a command to change an energy consumption level of the sensor node without requiring the intervention of one or more of the power management circuit 106 or the general purpose processor circuit 112.

FIGS. 2A through 2D illustrate generally an illustrative example (e.g., depicted using the portions 200A through 200D) of an architecture of at least a portion of a sensor node, such as can include an integrated circuit. The portions 200A through 200D illustrate generally a system, such as a portion of an SoC, that can provide sensing capabilities. Such sensing capability can be used for obtaining physiologic information, such as for real-time transmission or for storage. In illustrative examples, such information can include one or more of an electrocardiogram (ECG); an electroencephalogram (EEG); an electromyogram (EMG); or other physiologic information such as information indicative of health or wellness including gait data or body temperature, for example. The sensor node can provide one or more of data acquisition, signal analysis, processing, or wireless communication, and can include a battery-less configuration or an energy-harvesting circuit 202.

The illustrative example of FIGS. 2A through 2D can include or can be coupled to one or more communication circuits, such as shown in the examples of FIG. 6 or 7A through 7C, or to other circuits or modules such as discussed in other examples. For example, in FIG. 2A, the sensor node can include a clock circuit 230 (e.g., a clock generation circuit) configured to generate one or more clock signals for use by other circuits. Such clock signals can be further modified such as using a clock signal conditioning circuit 242 (e.g., a clock arbiter), such as shown in the illustrative example of FIG. 5. The sensor node can include a power supply circuit (e.g., a regulator circuit) 202, such as configured to run exclusively on harvested energy or using one or more other power sources (e.g., a capacitor, or a rechargeable or primary battery).

Figure 2A:
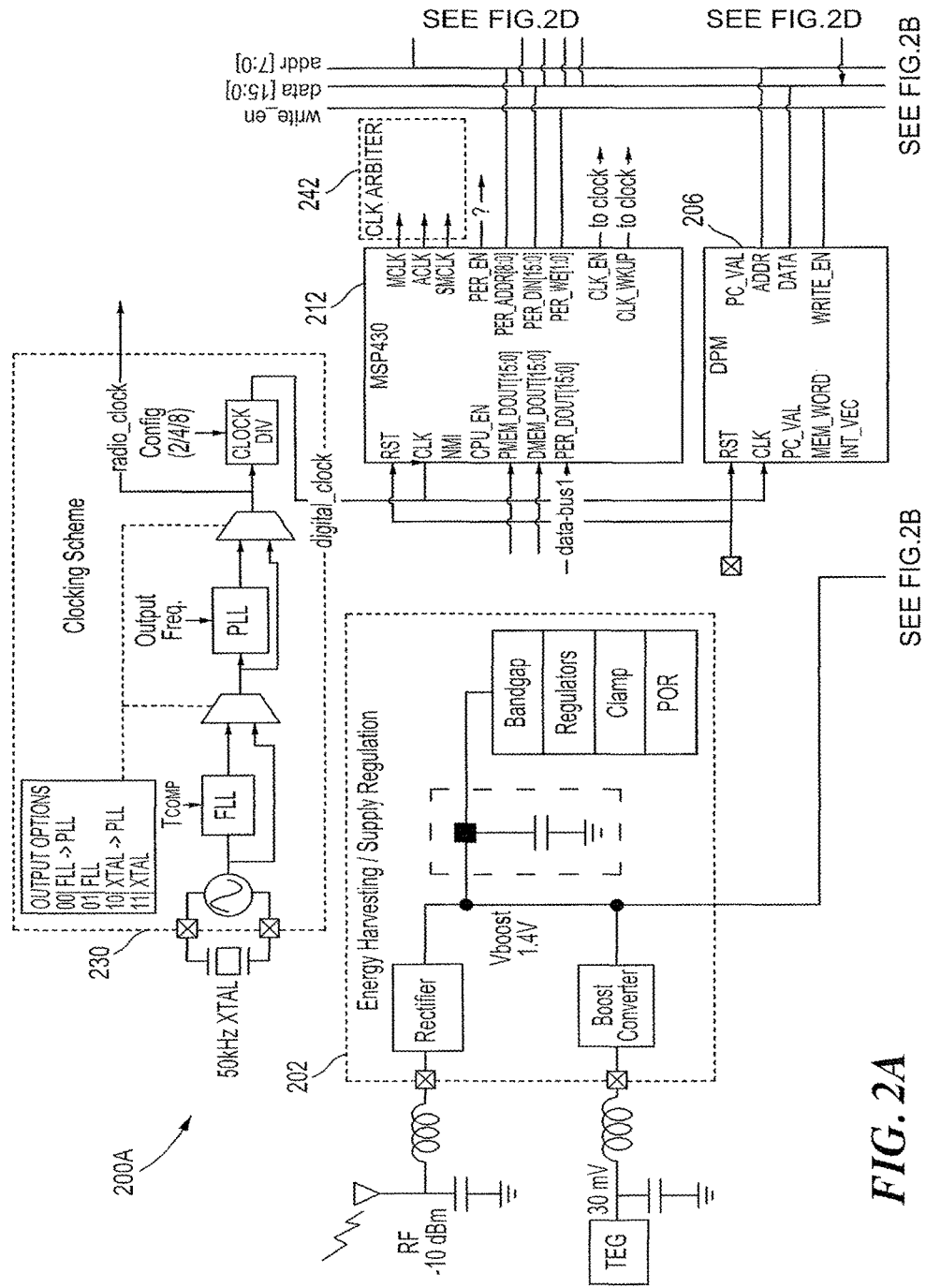
FIGS. 2A through 2D illustrates generally an example of an architecture for a sensor node or a portion of a sensor node such as can be included in an integrated circuit.
Figure 2B:
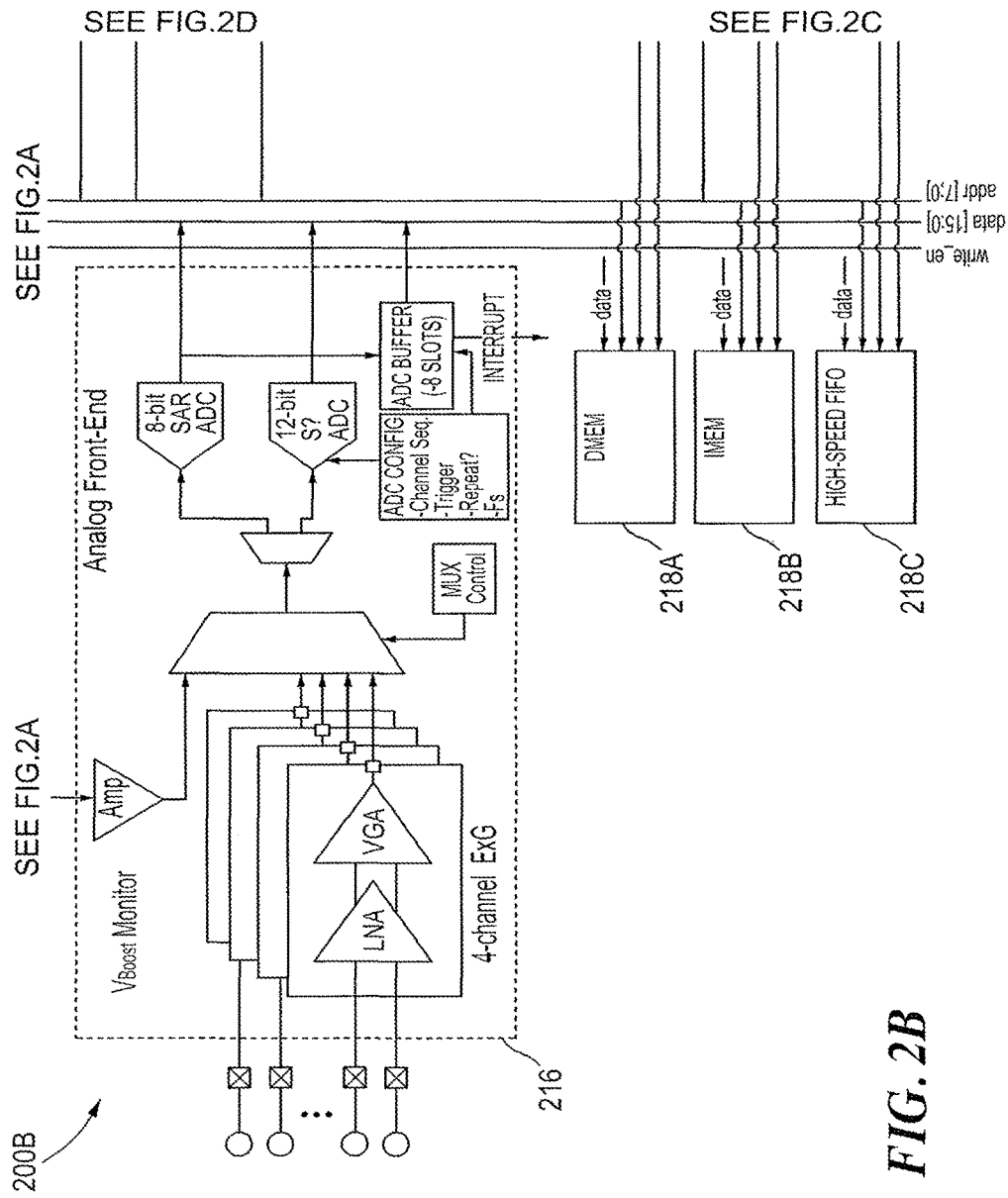
Figure 2C:
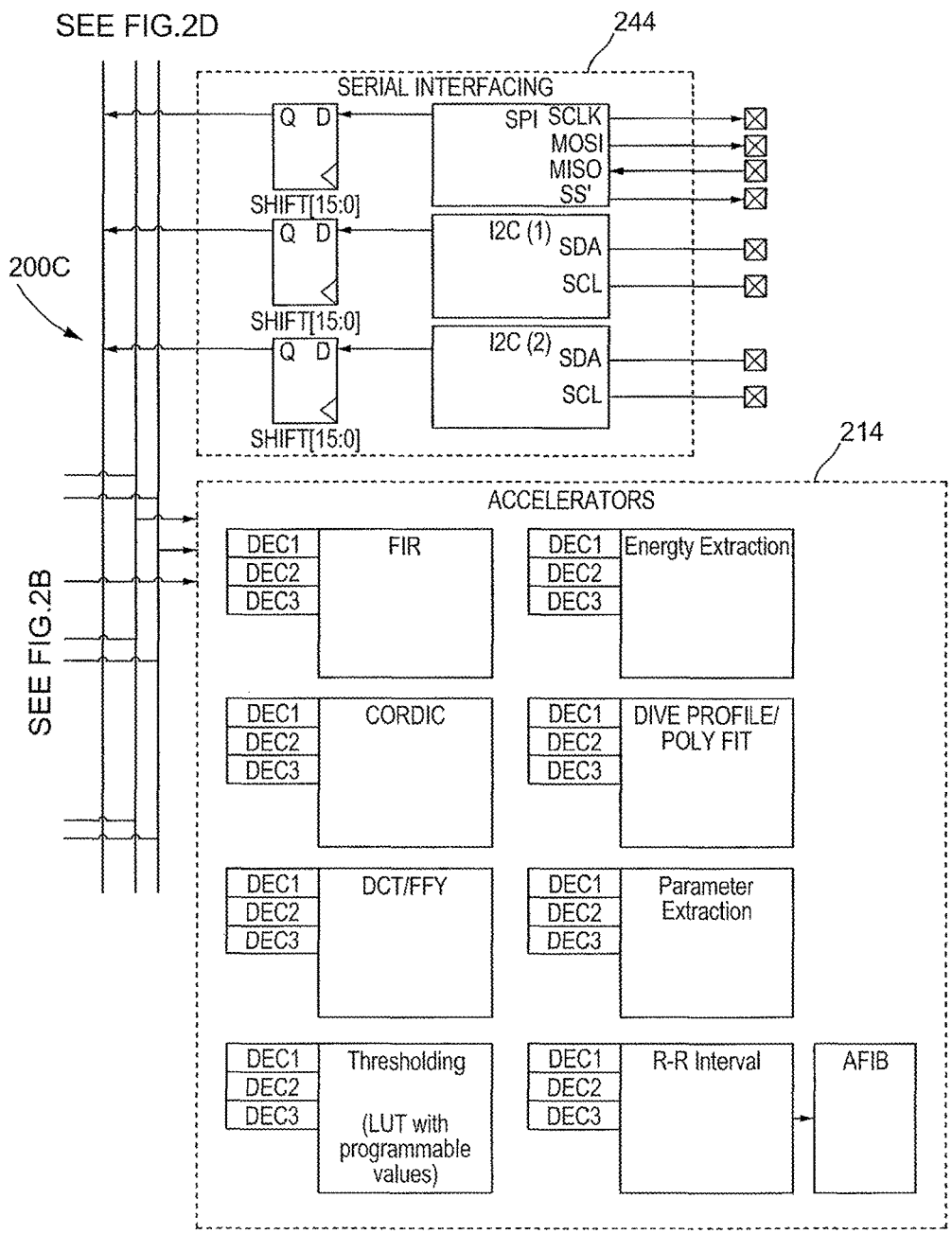
Figure 2D:
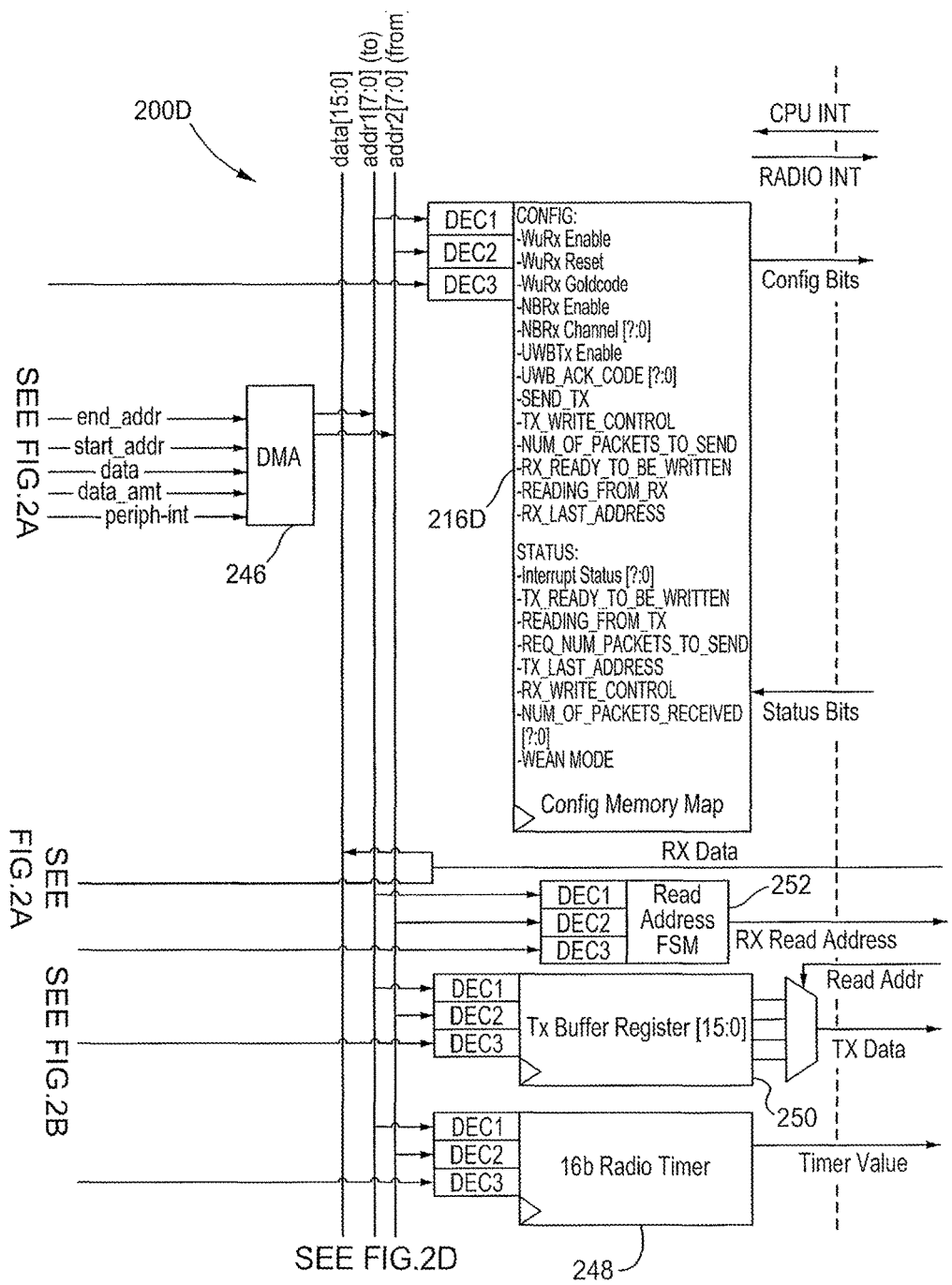

The sensor node can include a digital section configured for a subthreshold operational mode, such as configured to perform processing through one or more function-specific processor circuits 216 (e.g., as shown in FIG. 2C), or a general purpose processor circuit 212 (e.g., as shown in FIG. 2A). The digital section can include a power management circuit 206, the general purpose processor circuit 212 (e.g., a low "weight" microcontroller), and a memory circuit. For example, the memory circuit may include an instruction memory 218B, a data memory 218A, and one or more FIFOs such as a high-speed FIFO 218C (e.g., as shown in FIG. 2B).

For another example, the sensor node can include a digital section having one or more portions configured for a subthreshold operational mode and one or more portions configured for a superthreshold operational mode. Such an arrangement of an SoC can be used, for example, in connection with interfacing with components, devices, or peripherals that are on a different chip ("off-chip"). The SoC can perform certain functions within the chip using the digital section portion(s) operating in subthreshold and can perform certain functions such as off-chip access or interface using the digital section portion(s) operating in superthreshold. Alternatively, a common digital section can be configured to operate in subthreshold while in one operational mode and to operate in superthreshold while in another operational mode. For example, such a common digital section can operate in the subthreshold operational mode while performing local functions and can switch to operating in the superthreshold operational mode while accessing or interfacing with peripherals off chip.

As shown in FIG. 2B, the sensor node can include an analog "front-end" (e.g., an analog input circuit 216), such as can include a low noise amplifier (LNA) or a variable gain amplifier (VGA)). The analog "front-end" can include one or more of a programmable gain or one or more analog-to-digital converters (e.g., a 12-bit and an 8-bit analog-to-digital converter).

In the illustrative example of FIGS. 2A through 2D, the sensor node can obtain information indicative of physiologic signals or other information such as using the four-channel analog input 216. Signals provided to the four-channel analog input 216 can be digitized using one or more of an 8 bit (e.g., a successive approximation converter) or a 12 bit (e.g., sigma-delta) converter, or one or more other topologies, depending on the sampling frequency, precision, or accuracy desired, or based on a selected energy consumption level.

The sensor node can include one or more conductively-coupled communication circuits, such as conforming to one or more standards (e.g., an I2C communication interface, or an SPI configuration interface). For example, information indicative of physiologic activity can be obtained such as using one or more off-the-shelf sensors such as an accelerometer, and can be transferred to other circuitry in the sensor node using one or more interfaces provided by a serial section 244.

In the illustrative example of FIGS. 2A through 2D, data can be transferred between various circuits such as using one or more 16-bit buses, or using other topologies. For example, such data buses can be used for transfer of information between the analog input 216 or serial section 244 and other circuitry. In an illustrative example, a first bus can be controlled by one or more of the power management circuit 206 (e.g., a digital power manager (DPM)) or the general purpose processor circuit 212 (e.g., an openMSP430 microcontroller circuit, or one or more other processor circuits). For example, the first bus can use two clock cycles to move data between peripheral memory locations. In an illustrative example, a second bus can be controlled by a Direct Memory Access (DMA) controller circuit 246 (e.g., a two-channel DMA controller circuit), such as provide single-cycle moves to reduce energy consumption. Both buses can use an 8-bit addressing scheme. The DMA controller circuit 246 can be used to facilitate information transfer between one or more wireless communication circuits and a memory circuit without requiring use of other more energy-consuming circuits such as the general purpose processor circuit 212.

In an illustrative example, an ultra low power (ULP) wireless receiver circuit can be configured to wirelessly receive information and to transfer at least a portion of the received information to one or more of the data memory 218A or the instruction memory 218B, or to one or more other locations (e.g., a configuration register), such as using DMA, without requiring use of the general purpose processor circuit 212.

The one or more function-specific processor circuits 216 can be easily incorporated or removed from the architecture without disrupting the structure of the other circuits in the architecture. For example, one or more function-specific processor circuits 216 can be included or removed depending on the nature of the information to be obtained by the sensor node.

The one or more function specific processor circuits 216 can be configured for operation in one or more of a sub-threshold and superthreshold operational mode. For example, a subthreshold operational voltage can be determined at least in part using information about processing timing requirements (e.g., a minimum, a maximum, or a specified duration over which a processing function may be completed), to provide enhanced energy efficiency, such as based on a selected energy consumption level.

A subthreshold operational voltage can be specified to provide a minimum or reduced energy consumption while meeting a required timing specification, or noise margin. In an illustrative example, selection of a superthreshold or subthreshold operating voltage can be established in a CMOS design such as using a power supply voltage that is selectable through one or more PMOS headers, such as power gated to reduce leakage, such as based on a selected energy consumption level.

The one or more function-specific processor circuits 216 can be configured to provide one or more of a Finite-Impulse-Response (FIR) filter circuit (e.g., having a selectable or controllable number of taps), a Fast-Fourier-Transform (FFT) circuit, an Infinite-Impulse-Response (IIR) filter circuit, a discrete cosine transform (DCT) circuit, a polynomial-fitting circuit, a comparator circuit, a parametric extraction circuit, an interval determination circuit, a coordinate rotation digital calculation (CORDIC) circuit, or one or more other circuits. Other examples of processor circuits can include an R-R interval extraction circuit, such as can be configured to use a Pan Tompkins algorithm, or an atrial fibrillation detection circuit.

In an illustrative example, the general purpose processor circuit 212 can include an open-source microcontroller, such as an openMSP430 architecture (e.g., synthesized from code available from "opencores.com" (Stockholm, Sweden)), such as configured to perform one or more instructions included in an MSP430 instruction set. Such a general purpose processor circuit 212 can be used to perform instructions or operations not available through the one or more function-specific processor circuits 216. In an example, the general purpose processor circuit 212 can be suspended or disabled, such as power supply gated or clock gated, based on the selected energy consumption level. During an interval where the general purpose processor circuit 212 is power supply gated or clock gated, a wireless receiver circuit (e.g., the first wireless receiver circuit of examples discussed elsewhere) can receive information indicative of instructions to be performed by the general purpose processor circuit 212. The general purpose processor circuit 212 can be re-enabled, such as to perform operations based on the received instructions.

The power management circuit 206 can be "lighter weight" than the general purpose processor circuit 212, such as including a simpler or more power-efficient architecture configured for simple operations (e.g., supervisory operations) to reduce or eliminate a need for the general purpose processor circuit 212 to be active and consuming power. The power management circuit 206 can be configured to manage power consumption of the sensor node, such as reducing the node's power consumption as the rate of energy harvesting decreases, or in response to other events such as a received sleep command or other commands. The power management circuit can be programmable, and can be configured to change a power consumption configuration to a desired state within a single clock cycle, including predicting a need for a change in a power consumption state. Such a power consumption state can include, for example, placing one or more circuits in a standby or reduced power consumption operational mode, establishing a subthreshold operational mode, or establishing a superthreshold operational mode.

The sensor node can include other circuits, such as one or more timers (e.g., a 16-bit radio timer 248), a transmit buffer register 250, or one or more finite state machines (FSMs), such as a read address FSM 252. Control of various circuits can occur using the first or second buses, or using memory-mapped configuration information, such as a configuration memory map 216D that can be used to control one or more wireless communication circuits. A memory map can be used for configuration or control of other circuitry, such as to configure or control the one or more function-specific processor circuits 216.

Figure 3:
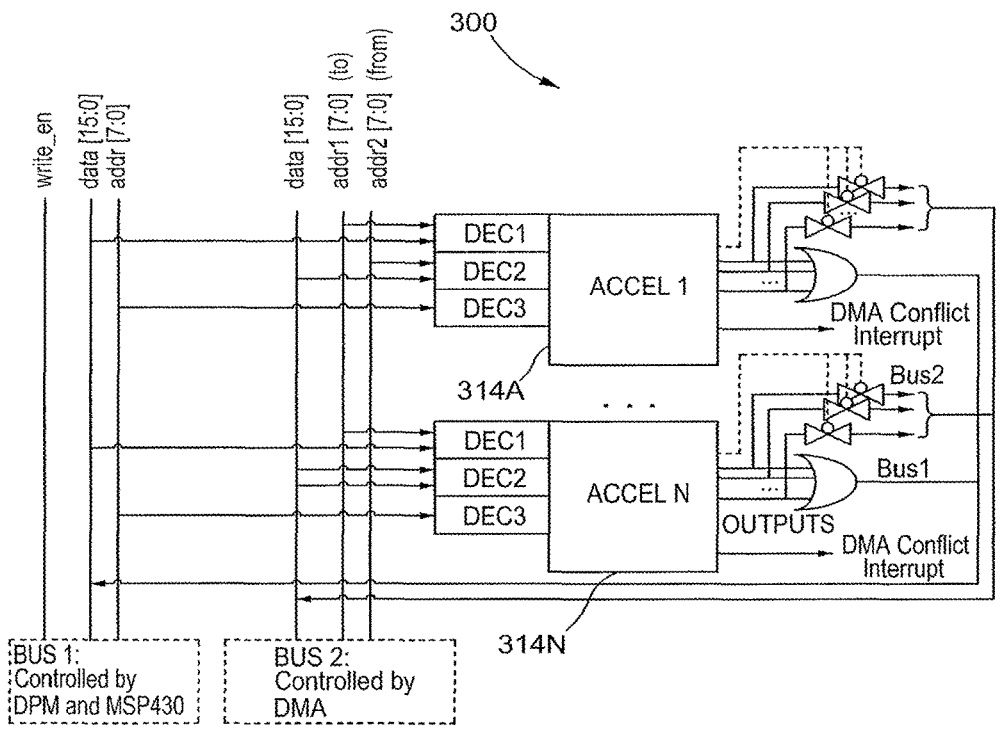
FIG. 3 illustrates generally an addressing scheme that can be included as a portion of a sensor node.

FIG. 3 illustrates generally an addressing scheme 300 that can be included as a portion of a sensor node. As discussed in the illustrative example of FIGS. 2A through 2D, the sensor node can a first bus controlled by one or more of the power management circuit 206 (e.g., a digital power manager (DPM)) or the general purpose processor circuit 212 (e.g., an openMSP430 microcontroller circuit, or one or more other processor circuits), and a second bus controlled by a Direct Memory Access (DMA) controller circuit 246. The one or more function-specific processor circuits (e.g., a first accelerator circuit 314A through an "Nth" accelerator circuit 314N) can include three respective decoders each, such as configured to avoid write conflicts between the two buses.

Figure 4:
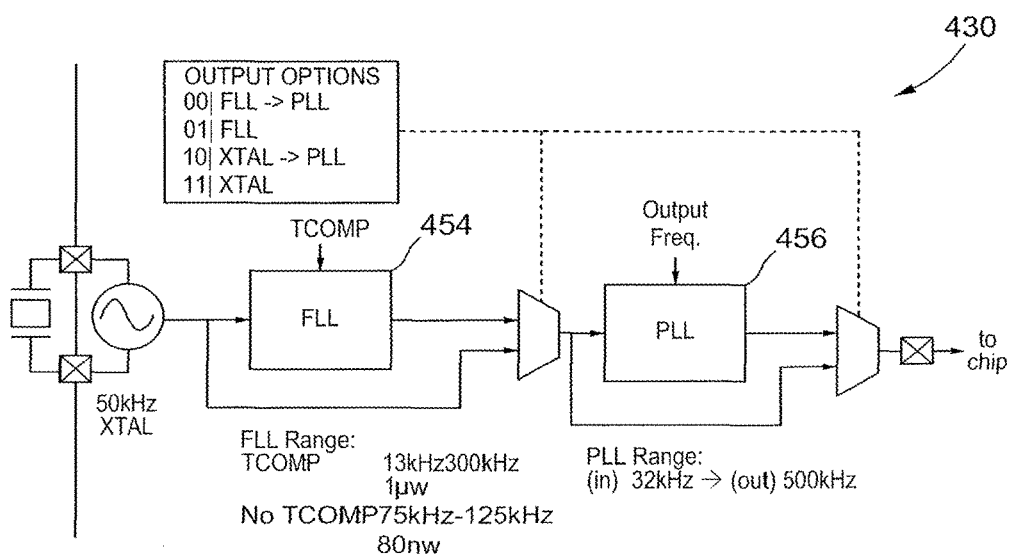
FIG. 4 illustrates generally a clocking scheme that can be included as a portion of a sensor node.

FIG. 4 illustrates generally a clocking scheme 430 that can be included as a portion of a sensor node. In the example of FIG. 4, a temperature stabilized low-power frequency loop lock (FLL) 454 can be used, such as to provide a specified lock frequency corresponding to a mode of a crystal (e.g., locked to a 50 kilohertz (kHz) crystal oscillator). Depending on a configurable operating mode (e.g., based on a selected energy consumption level), a second feedback loop can be used, such as including a phase locked loop (PLL) 456, such as to provide a frequency range extended beyond a range available using the PLL 456 alone, such as up to 500 kHz in an illustrative example. One or more of the FLL 454 or the PLL 456 can be bypassed, such as to provide a less stable crystal-referenced output while consuming less power, such as based on selected energy consumption level.

Figure 5:
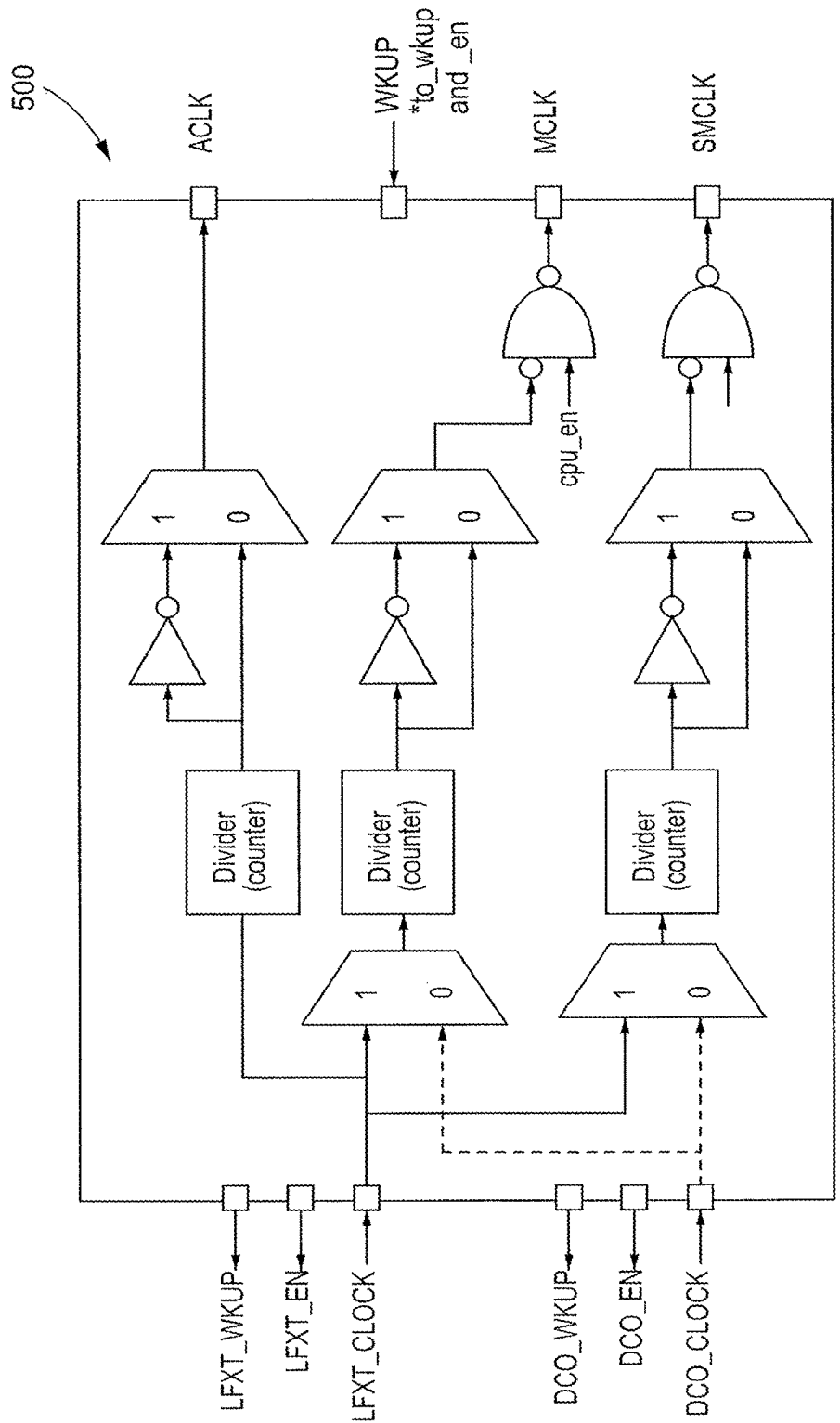
FIG. 5 illustrates generally a clock signal conditioning circuit that can be included as a portion of a sensor node, the clock signal conditioning circuit configurable to provide a specified clock signal.

FIG. 5 illustrates generally a clock signal conditioning circuit 542 (e.g., a clock arbiter) that can be included as a portion of a sensor node, the clock signal conditioning circuit 542 configurable to provide a specified clock signal. The clock signal conditioning circuit 542 can provide one or more programmable clocks, such as for use by one or more of an analog input (e.g., an analog-to-digital converter sample clock, or one or more function-specific accelerator blocks), such as using one or more dividers (e.g., counters). In an illustrative example, the clock signal conditioning circuit 542 can be included in a digital section of the sensor node, such as included within a footprint of the general-purpose processor circuit layout included in an integrated circuit.

Figure 6:
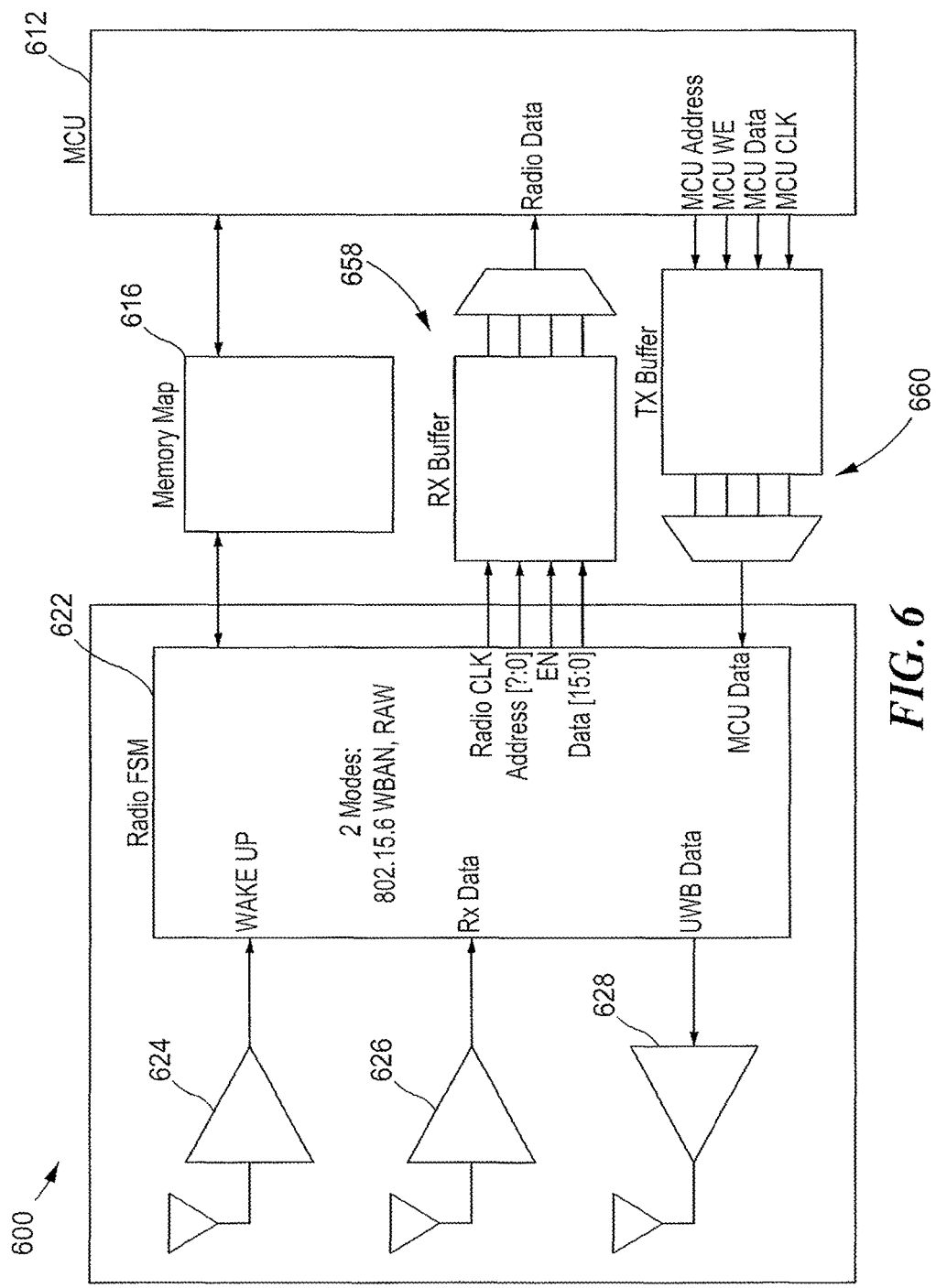
FIG. 6 illustrates generally an example of a portion of a sensor node that can include three communication circuits coupled to a baseband controller circuit (e.g., a finite state machine).

FIG. 6 illustrates generally an illustrative example 600 of a portion of a sensor node that can include, for example, three communication circuits coupled to a baseband controller circuit 622 (e.g., a finite state machine (FSM)). The three communication circuits can include a first receiver circuit 624 (e.g., an ultra low power receiver circuit that can be continuously enabled or nearly continuously enabled), a second receiver circuit 626 (e.g., narrow-band receiver), and a first transmitter circuit 628 (e.g., an ultra-wide band transmitter, such as can be configured to support multiple Media Access Control (MAC) protocols).

One or more operational modes of the communications circuits, or triggering of various operations can be controlled such as using the baseband controller 622, without requiring a general purpose processor circuit 612 (e.g., a microcontroller unit (MCU)) to be powered up or in a high-power consumption mode. For example, the general purpose processor circuit 612 can be in a subthreshold operational mode or a low-power consumption standby mode while the first receiver circuit 624 awaits wireless receipt of one or more commands or instructions to be performed by the general purpose processor circuit 612.

A memory map 616 can be used to configure one of the baseband controller circuit 622 or one or more of the three communication circuits. For example, information to be transmitted by the first transmitter circuit 628 can be buffered for transmission, independent of the general-purpose processor circuit 612, such as using a transmit buffer 660. Similarly, information received, such as using the second receiver circuit 626, can be buffered using a receiver buffer 658 while awaiting transfer or processing by the general-purpose processor circuit 612.

Figure 7A:
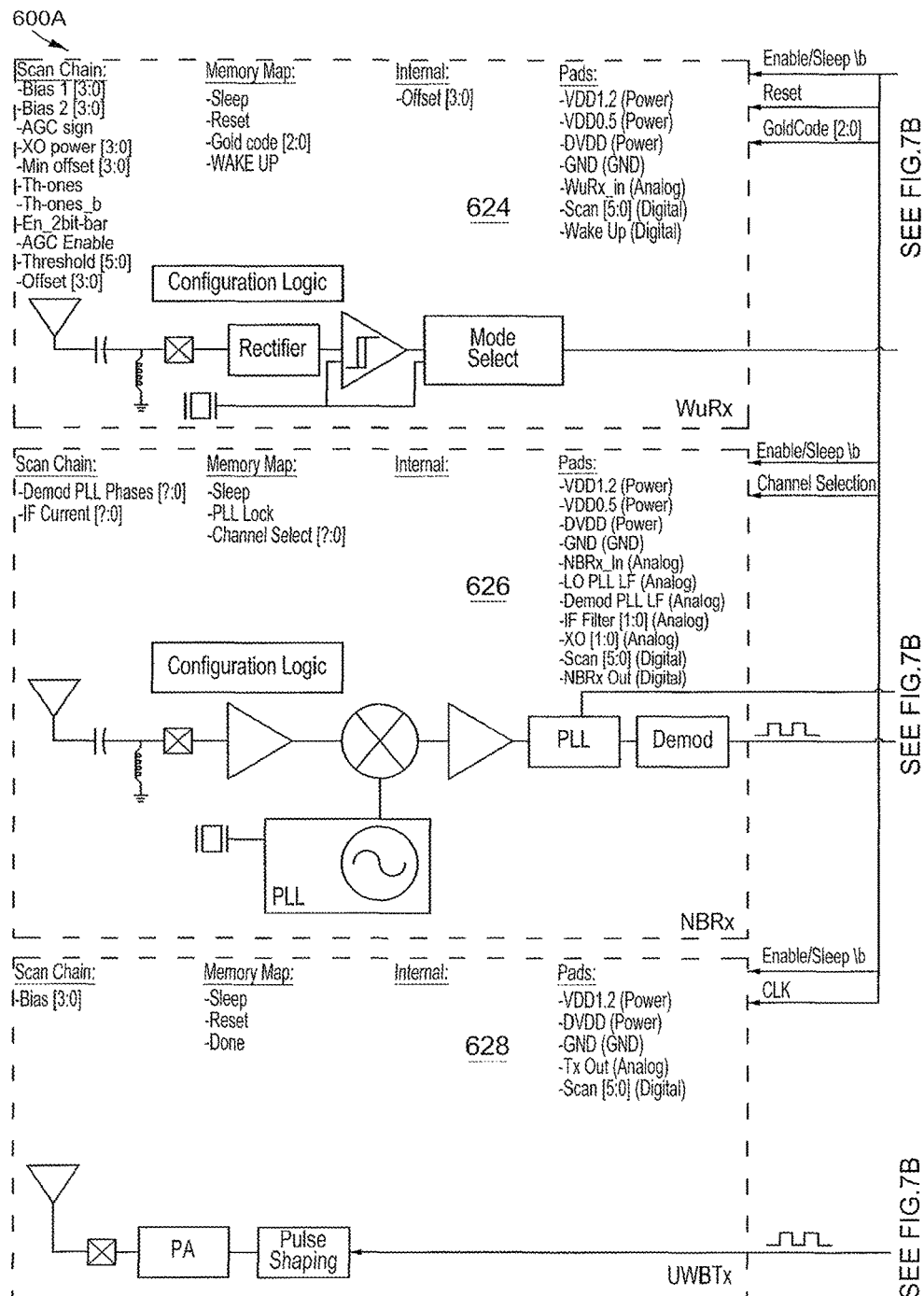
FIGS. 7A through 7C illustrate generally an illustrative example of an architecture of a portion of a sensor node that can include three communication circuits coupled to a baseband controller circuit (e.g., a finite state machine).
Figure 7B:
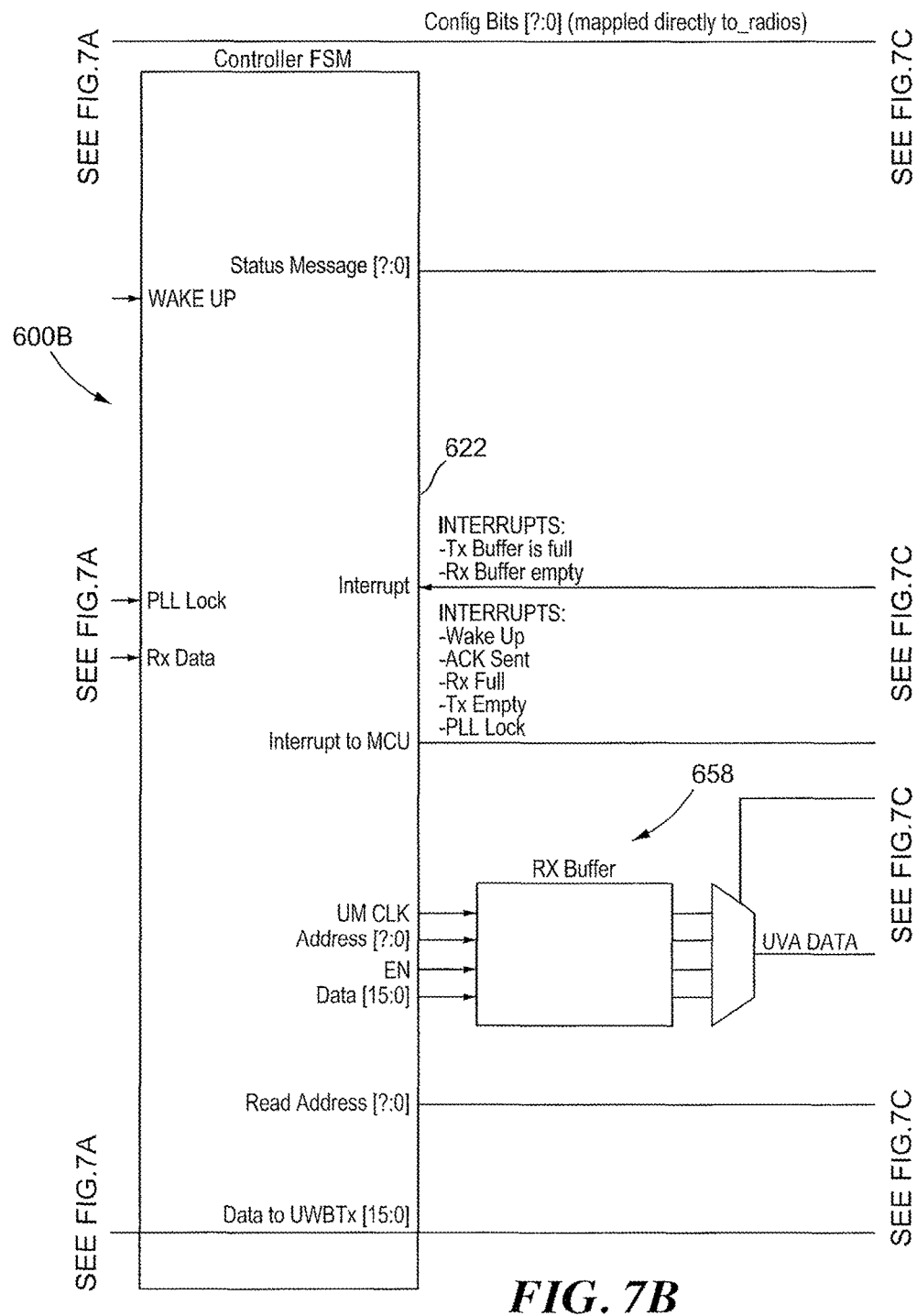
Figure 7C:
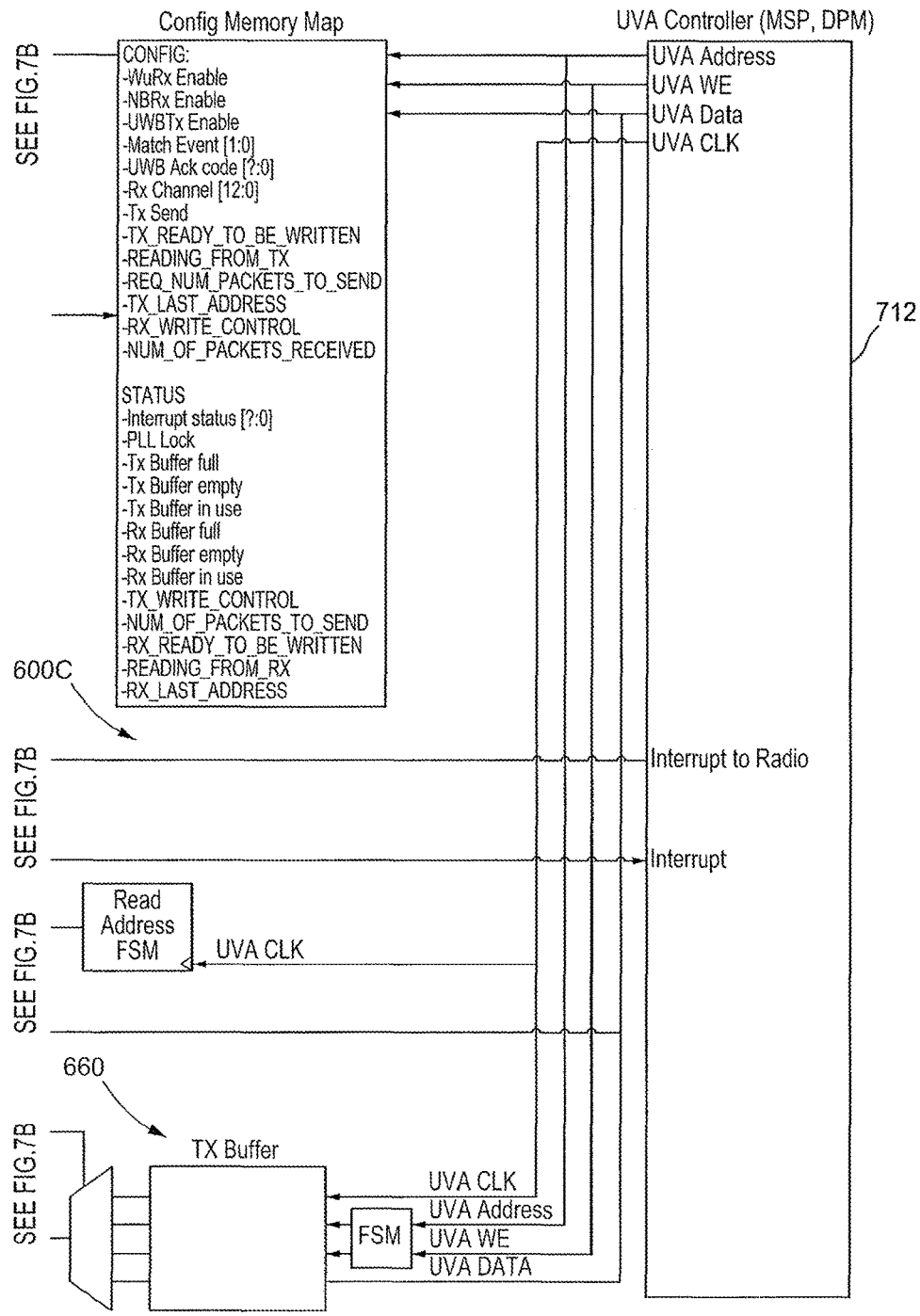

FIGS. 7A through 7C illustrate generally an illustrative example of an architecture of portions 600A through 600C of a sensor node that can include three communication circuits coupled to a baseband controller circuit, such as shown and discussed generally in the example of FIG. 6. A first wireless receiver circuit 624 can include a tuned receiver circuit and envelope detector (e.g., to receive one or more of amplitude-shift-keyed or on-off-keyed wireless signals). The first wireless receiver circuit 624 can be configured to remain operational constantly (e.g., an "always on" mode), or to power-up during specified durations to "sniff" for a specified command, such as one or more commands. Power consumption performance of the first wireless receiver circuit 624 can be enhanced at least in part at a cost of reduced sensitivity. For example, the first wireless receiver circuit 624 can include a net gain of about unity or less before detection or rectification. In an illustrative example, the first wireless receiver circuit 624 can include an ultra-low-power (ULP) architecture, such as consuming less than about 100 nW at a sensitivity of about −40 decibels relative to one milliwatt (dBm), using a first specified data transfer rate.

The second wireless receiver circuit 626 can include a narrow-band receiver, such as configured to receive one or more of angle-modulated or amplitude-modulated wireless communication signals. The second wireless receiver circuit can include one or more phase-locked loops (PLLs), and can receive information a second specified data transfer rate. Generally, a power consumption of the second receiver circuit 626 can be higher than the first receiver circuit 624. The second receiver circuit 626 can remain in a low power consumption state, such as a standby mode, unless activated, such as in response to a command received by the first receiver circuit 624, or based on a selected energy consumption level established by a power management circuit.

The first wireless transmitter circuit 628 can include a wideband transmit circuit (e.g., an ultrawideband (UWB) transmitter), or other architecture, such as configured to transmit information wirelessly including energy at about 1 GHz or higher. For example, the first transmitter circuit 628 can be configured to transmit a burst of wireless information. The first wireless transmitter circuit 628 can use a specified data transfer rate that is higher than either of the first receiver circuit 624, or the second receiver circuit 626. Such a difference in data transfer rates between respective communication circuits can be referred to as an "asymmetric" communication configuration. Such an asymmetric configuration can be desirable for a sensor node, because the sensor node will generally have large amounts of sensed physiologic information to upload to another device while generally only receiving limited amounts of data such as operational commands, configuration information, or firmware updates.

As shown and discussed in the example of FIG. 6, the communications circuits can be coupled to a baseband controller 622 such as a finite state machine (FSM). For example, a first type of command can be received using the first wireless receiver circuit 624, and in response, the baseband controller circuit 622 can trigger the first transmitter circuit 628 to transmit a burst of buffered information (e.g., stored using a transmit buffer 660 or elsewhere). In another example, a second type of command can be received using the first wireless receiver circuit 624, and in response, the baseband controller 622 can "awaken" one or more other portions of the sensor node, such as transitioning a general purpose processor circuit 712 from a low power consumption state (e.g., a standby operational mode or a subthreshold operational mode) into a higher power consumption state.

In another example, the baseband controller circuit 622 can route information received by the first or second receiver circuits 624, 626 to a receive buffer 658, generate or receive one or more interrupts, or generally steer such information into one or more of instruction memory, data memory, configuration registers, or memory mapped registers, without requiring use of the general purpose processor circuit. Generally, the baseband controller 622 can also be configured to select operational modes of the communication circuits at least in using information about a selected energy consumption state. In this manner, modes such as buffered or burst communication, protocol selection, data transfer rate, modulation technique, or operating frequency range can be established using information about available energy, under the control of one or more of a power management circuit or one or more processor circuits.

Figure 8:
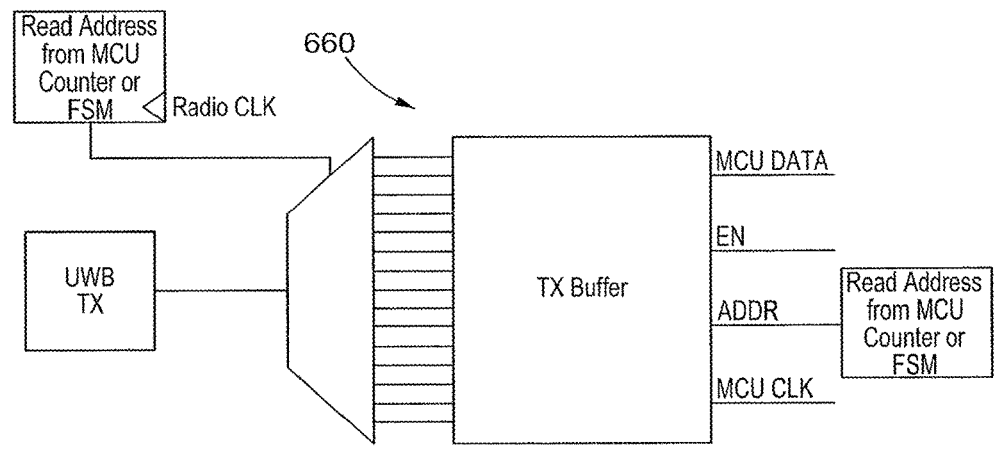
FIG. 8 illustrates generally an example of a transmit buffer architecture that can be included as a portion of a sensor node.

FIG. 8 illustrates generally an example of a transmit buffer 660 architecture that can be included as a portion of a sensor node, such as can be used in relation to one or more examples discussed above or below.

Figure 9:
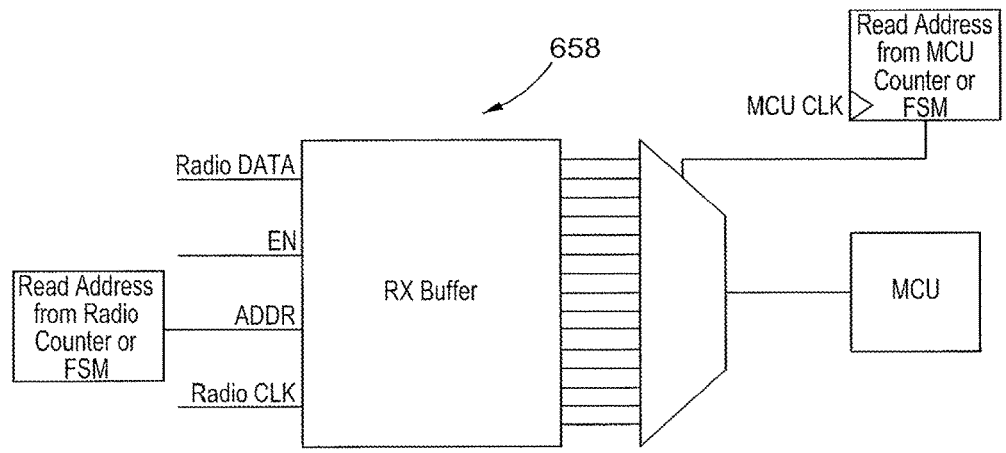
FIG. 9 illustrates generally an example of a receive buffer architecture that can be included as a portion of a sensor node.

FIG. 9 illustrates generally an example of a receive buffer 658 architecture that can be included as a portion of a sensor node, such as can be used in relation to one or more examples discussed above or below.

Figure 10:
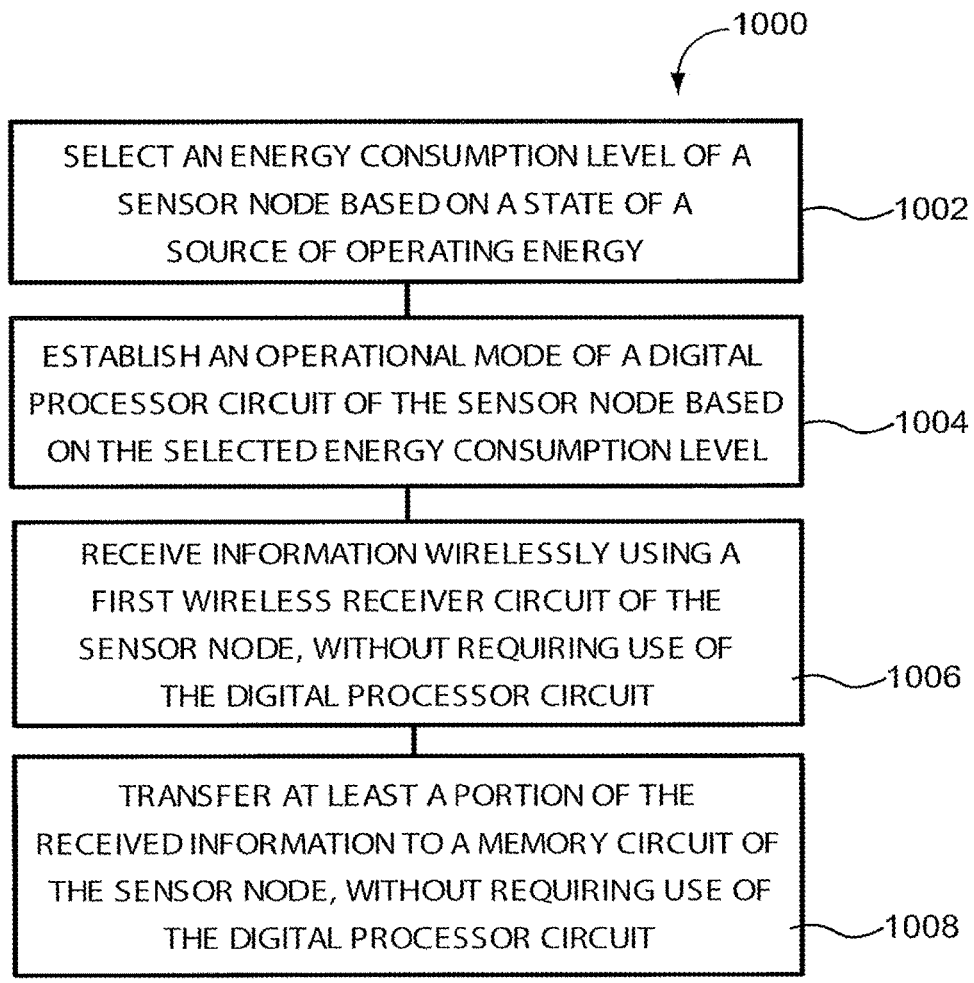
FIG. 10 illustrates generally a technique, such as a method, that can include establishing an operational mode of one or more portions of a sensor node, such as based on a state of a power source.

FIG. 10 illustrates generally a technique 1000, such as a method, that can include, at 1002, selecting an energy consumption level of a sensor node (e.g., as described and shown in the examples of FIG. 1A-1B, 2A-2D, 3-6, 7A-7C, or 8-9), such as based on a state of a source of operating energy. At 1004, an operational mode of a digital processor circuit (or one or more other circuits) can be established based on the selected energy consumption level of the sensor node. At 1006, information can be received wirelessly, such as without requiring use of the digital processor circuit. For example, the digital processor circuit can be one or more of suspended or disabled, and at 1008, wirelessly-received information can be transferred to a memory circuit without requiring use of the processor circuit. Such wirelessly-received information can include instructions that can be performed by the digital processor circuit.

As mentioned above, the SoCs discussed herein can predict energy-usage behaviors or patterns and cause changes in the operation of the sensor or SoC. For example, an SoC can include a prediction circuit (not shown) operatively coupled to or included as a portion within the power management circuit 206. The prediction circuit can receive signals indicating the status of the associated energy sources such as an on-chip power source, an off-chip source or an energy harvesting circuit (either on the SoC or off chip). The prediction circuit can analyze these status signals and the times associated with the status information to identify profiles, behaviors or patterns of the energy received and/or stored and the energy used. For example, the prediction circuit can identify correlations between harvested energy levels and times of day. For another example, the prediction circuit can identify correlations between harvest energy levels and sensor data such as a correlation between the monitored heart rate and body temperature of a person: when the monitored heart rate increases the body temperature likely increases, thereby making it more likely that the energy harvested from, for example, a thermo-electric based energy harvesting circuit will increase. For another example, the prediction circuit can identify periodicity within a certain tolerance.

Based on such predictions, the prediction circuit can send prediction signals to the power management circuit (or other portions of power management circuit). The prediction signals can indicate or present prediction information and/or the related data such as prediction profiles, prediction values, stored energy and time values, etc. Upon receiving the prediction signals, the power management circuit can select an operational mode for the SoC. For example, upon receiving the prediction signals, the power management circuit can select an operational mode of the SoC that is appropriate for a given power consumption level based on the prediction signals and/or other factors. For example, power management circuit can select an operational mode based on an amount of energy incoming to the SoC, an amount of stored energy associated with the SoC, or a rate of power consumption by the SoC.

VARIOUS NOTES & EXAMPLES

Each of the non-limiting examples disclosed in this document can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus, comprising:
a system on chip (SoC) having a first memory circuit portion and a second memory circuit portion, the first memory circuit portion configured to operate at a subthreshold voltage that establishes subthreshold operation of one or more field effect transistors associated with the first memory circuit portion, the subthreshold operation including conduction of current by the one or more field effect transistors, the second memory circuit portion configured to operate at a superthreshold voltage,
the SoC configured to access the second memory circuit portion in response to at least one of (1) signals being sent from the SoC, or (2) signals being received at the SoC.

2. The apparatus of claim 1, wherein:
the first memory circuit portion is configured to operate at the subthreshold voltage and not at a superthreshold voltage;
the second memory circuit portion is configured to operate at the superthreshold voltage and not at a subthreshold voltage.

3. The apparatus of claim 1, wherein:
the first memory circuit portion and the second memory circuit portion collectively define a memory circuit having a first operational mode and a second operational mode,
the memory circuit configured to operate the first memory circuit portion in response to the memory circuit being in the first operational mode, the memory circuit configured to operate the second memory circuit portion in response to the memory circuit being in the second operational mode.

4. The apparatus of claim 1, wherein:
the first memory circuit portion and the second memory circuit portion collectively define a memory circuit having a first operational mode and a second operational mode,
the memory circuit configured to operate the first memory circuit portion and not the second memory circuit portion in response to the memory circuit being in the first operational mode, the memory circuit configured to operate the second memory circuit portion and not the first memory circuit portion in response to the memory circuit being in the second operational mode.

5. The apparatus of claim 1, wherein the subthreshold operation of the one or more field effect transistors comprises one of (1) operating each of the one or more field effect transistors in a weak-inversion mode, (2) operating each of the one or more field effect transistors such that transconductance is at a relative or absolute maximum, or (3) operating each of the one or more field effect transistors such that transconductance is primarily dependent on a threshold voltage and a drain current.

6. The apparatus of claim 1, wherein:
the SoC includes a wireless communications circuit configured to receive information and to transfer at least a portion of the received information to the first memory circuit portion and/or the second memory circuit portion without use of a digital processor circuit.

7. The apparatus of claim 1, wherein the SoC is configured to access the first memory circuit portion and not the second memory circuit portion during an execution of a local function within the SoC.

8. The apparatus of claim 1, wherein the SoC is configured to access the second memory circuit portion and not the first memory circuit portion during an interaction with a component that is external to the SoC.

9. The apparatus of claim 1, wherein:
the first memory circuit portion and the second memory circuit portion collectively define a memory circuit having a subthreshold operational mode and a superthreshold operational mode,
the memory circuit configured to switch between operating in the subthreshold operational mode and operating in the superthreshold operational mode in response to the SoC executing a local function within the SoC and the SoC interacting with a component that is external to the SoC, respectively.

10. The apparatus of claim 1, wherein:
the first memory circuit portion and the second memory circuit portion collectively define a memory circuit having a subthreshold operational mode and a superthreshold operational mode,
the SoC further comprising:
a power management circuit configured to select an operational mode from a plurality of operational modes based on at least one of (1) an amount of energy incoming to the SoC, (2) an amount of stored energy associated with the SoC, or (3) a rate of power consumption by the SoC, the plurality of operational modes including the subthreshold operational mode and the superthreshold operational mode.

11. A method, comprising:
operating a first memory circuit portion of a system on chip (SoC) at a subthreshold voltage that establishes subthreshold operation of one or more field effect transistors associated with the first memory circuit portion, the subthreshold operation including conduction of current by the one or more field effect transistors;

operating a second memory circuit portion of the SoC at a superthreshold voltage; and accessing, by the SoC, the second memory circuit portion in response to at least one of (1) signals being sent from the SoC, or (2) signals being received at the SoC.

12. The method of claim 11, wherein:

operating the first memory circuit portion at the subthreshold voltage includes operating the first memory circuit portion at the subthreshold voltage and not at a superthreshold voltage;

operating the second memory circuit portion at the superthreshold voltage includes operating the second memory circuit portion at the superthreshold voltage and not at a subthreshold voltage.

13. The method of claim 11, wherein:

the first memory circuit portion and the second memory circuit portion collectively define a memory circuit having a first operational mode and a second operational mode, the method further comprising:

operating the first memory circuit portion in response to the memory circuit being in the first operational mode; and operating the second memory circuit portion in response to the memory circuit being in the second operational mode.

14. The method of claim 11, wherein:

the first memory circuit portion and the second memory circuit portion collectively define a memory circuit having a first operational mode and a second operational mode, the method further comprising:

operating the first memory circuit portion and not the second memory circuit portion in response to the memory circuit being in the first operational mode, operating the second memory circuit portion and not the first memory circuit portion in response to the memory circuit being in the second operational mode.

15. The method of claim 11, wherein:

the SoC includes a wireless communications circuit, the method further comprising:

receiving information at the wireless communications circuit and transferring at least a portion of the received information to the first memory circuit portion and/or the second memory circuit portion without use of a digital processor circuit.

16. The method of claim 11, further comprising accessing, by the SoC, the first memory circuit portion and not the second memory circuit portion during an execution of a local function within the SoC.

17. The method of claim 11, wherein accessing the second memory circuit portion includes accessing the second memory circuit portion and not the first memory circuit portion during an interaction with a component that is external to the SoC.

18. The method of claim 11, wherein:

the first memory circuit portion and the second memory circuit portion collectively define a memory circuit having a subthreshold operational mode and a superthreshold operational mode, the method further comprising:

selecting, via a power management circuit, an operational mode from a plurality of operational modes based on at least one of (1) an amount of energy incoming to the SoC, (2) an amount of stored energy associated with the SoC, or (3) a rate of power consumption by the SoC, the plurality of operational modes including the subthreshold operational mode and the superthreshold operational mode.

19. The method of claim 11, wherein the subthreshold operation of the one or more field effect transistors comprises one of (1) operating each of the one or more field effect transistors in a weak-inversion mode, (2) operating each of the one or more field effect transistors such that transconductance is at a relative or absolute maximum, or (3) operating each of the one or more field effect transistors such that transconductance is primarily dependent on a threshold voltage and a drain current.

20. A method, comprising:

identifying, for a sensor node that includes a system on chip (SoC), an energy consumption level based on at least one of (1) an amount of energy incoming to the SoC, (2) an amount of stored energy associated with the SoC, or (3) a rate of power consumption by the SoC, the SoC including a wireless communications circuit, and a memory circuit that is configured to operate in one or more of a subthreshold operational mode and a superthreshold operational mode, wherein the subthreshold voltage establishes subthreshold operation of one or more field effect transistors associated with the memory circuit, the subthreshold operation including conduction of current by the one or more field effect transistors;

selecting, via a power management circuit, an operational mode from a plurality of operational modes based on the established energy consumption level, the plurality of operational modes including the subthreshold operational mode and the superthreshold operational mode;

wirelessly receiving, at the wireless communications circuit, information; and transferring, via the wireless communications circuit, at least a portion of the received information to the memory circuit without use of a digital processor circuit.

21. The method of claim 20, wherein:

the memory circuit includes a first memory circuit portion and a second memory circuit portion, the memory circuit configured to operate the first memory circuit portion and not the second memory circuit portion when the memory circuit is in one of the subthreshold operational mode and the superthreshold operational mode, and the memory circuit configured to operate the second memory circuit portion and not the first memory circuit portion when the memory circuit is in the other of the subthreshold operational mode and the superthreshold operational mode.

22. The method of claim 20, wherein the SoC further includes a digital processor circuit, the method further comprising reactivating the digital processor circuit from a state of inactivity when the received information includes an instruction for the digital processor circuit to perform an operation.

23. The method of claim 20, wherein the subthreshold operation of the one or more field effect transistors comprises one of (1) operating each of the one or more field effect transistors in a weak-inversion mode, (2) operating each of the one or more field effect transistors such that transconductance is at a relative or absolute maximum, or (3) operating each of the one or more field effect transistors such that transconductance is primarily dependent on a threshold voltage and a drain current.

* * * * *